(12) United States Patent
Nakamura et al.

(10) Patent No.: US 6,879,468 B2
(45) Date of Patent: Apr. 12, 2005

(54) MAGNETIC HEAD ACTUATOR HAVING AN IMPROVED MICROACTUATOR OSCILLATABLY SUPPORTED BY METALLIC MICRO-BEAMS

(75) Inventors: Hajime Nakamura, Takefu (JP); Takehisa Minowa, Takefu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 98 days.

(21) Appl. No.: 10/345,308

(22) Filed: Jan. 16, 2003

(65) Prior Publication Data

US 2004/0130832 A1 Jul. 8, 2004

(30) Foreign Application Priority Data

Jan. 8, 2003 (JP) .......................................... 2003-001929
Jan. 8, 2003 (JP) .......................................... 2003-001904

(51) Int. Cl.[7] ................................................. G11B 5/56
(52) U.S. Cl. ................................................. 360/294.1
(58) Field of Search ....................................... 360/294.5

(56) References Cited

U.S. PATENT DOCUMENTS

| | | | | |
|---|---|---|---|---|
| 5,657,188 A | * | 8/1997 | Jurgenson et al. | ....... 360/294.3 |
| 5,973,882 A | | 10/1999 | Tangren | |
| 6,078,473 A | | 6/2000 | Crane et al. | |
| 6,163,434 A | * | 12/2000 | Zhang | ..................... 360/294.5 |
| 6,166,890 A | | 12/2000 | Stefansky et al. | |
| 6,295,185 B1 | | 9/2001 | Stefansky | |
| 6,335,850 B1 | * | 1/2002 | Dunfield et al. | ......... 360/294.5 |
| 6,614,628 B2 | * | 9/2003 | Crane et al. | ............. 360/294.5 |
| 2002/0036870 A1 | | 3/2002 | Shiraishi et al. | |

OTHER PUBLICATIONS

R. B. Evans et al., IEEE Transactions on Magnetics, vol. 35, No. 2, pp. 977–982, Mar. 1999.
H. Fujita et al., IEEE Transactions on Magnetics, vol. 35, No. 2, pp. 1006–1010, Mar. 1999.
L. Koganezawa et al., IEEE Transactions, vol. 32, No. 5, pp. 3908–3910, Sep. 1996.

* cited by examiner

*Primary Examiner*—A. J. Heinz
(74) *Attorney, Agent, or Firm*—Birch, Stewart, Kolasch & Birch, LLP

(57) ABSTRACT

A magnetic head actuator for a magnetic recording disk drive, comprising a micro-actuator which is provided at a tip end portion of a load beam attached to an arm of a voice coil motor and which is for oscillating a magnetic head slider, wherein one end of the micro-actuator is fixed to a stator portion fixed to the load beam, a gimbal portion and a rotor portion oscillatably supported by metallic micro-beams formed by bending are provided on the side of the other end of the micro-actuator, the magnetic head slider is attached to the gimbal portion, either one of a permanent magnet and a coil is disposed at the stator portion, the other of the permanent magnet and the coil is disposed at the rotor portion, and the rotor portion and the magnetic head slider attached to the gimbal portion as one body with the rotor portion are oscillated by passing an electric current to the coil in a magnetic field formed by the permanent magnet.

7 Claims, 25 Drawing Sheets

MAGNETIC HEAD ACTUATOR HAVING AN IMPROVED MICROACTUATOR OSCILLATABLY SUPPORTED BY METALLIC MICRO-BEAMS

This nonprovisional application claims priority under 35 U.S.C. §119 (a) on Patent Application No. 2003-001904 filed in JAPAN on Jan. 8, 2003 and 2003-001929 filed in JAPAN on Jan. 8, 2003, which is herein incorporated by reference.

BACKGROUND OF THE INVENTION

The present invention relates to a head actuator of a magnetic recording disk drive.

A magnetic recording disk drive is a system for performing recording/reproduction of information by scanning a magnetic head over a rotating ferromagnetic medium, or a magnetic recording disk, and is widely used as the center of storage devices for supporting the modern information age. The magnetic head is contained in a slider, which is flying over the magnetic recording disk with a gap on the order of nanometers therebetween at the time of recording/reproduction. A driving force for moving the magnetic head to a predetermined position is generally generated by a voice coil motor (VCM). The coil of the voice coil motor is connected to an arm rotatably supported by a pivot, and, further, a magnetic head slider is attached to the tip end of the arm via a suspension which consists of a load beam and a gimbal. The load beam is a spring member for generating a load which balances with the flying height of the slider, and the gimbal is a spring member which supports the slider and which absorbs the inclinations arising from assemblage and the surface oscillations of the disk without spoiling follow-up performance for tracking, by undergoing elastic deformations in the directions other than planes parallel to the disk surface. With this constitution, the magnetic head can be moved to a predetermined track on the rotating disk while maintaining a stable condition.

In recent years, the recording density of the magnetic recording disk drives has been enhanced (i.e., the track width has been reduced) more and more, and, since the magnetic head must be accurately positioned on the narrow track, it is necessary to enhance the accuracy in positioning the head. Conventionally, the positioning of the head has been conducted by only a large actuator such as the above-entioned voice coil motor; however, this system does not have a sufficient precision for the narrowed track width. In view of this, a mechanism for high-precision positioning or a micro-actuator has come to be indispensable for high recording density disk drives.

A variety of micro-actuators have hitherto been proposed for achieving the high-precision positioning, and they can be generally classified, on the basis of driving force, into three types, i.e., (1) electrostatic force, (2) electrostriction of piezoelectric material, and (3) electromagnetic force.

The conventional micro-actuator utilizing the electrostatic force of type (1) above (Fujita et al., IEEE TRANSACTIONS ON MAGNETICS, Vol. 35, No. 2, March 1999, pp. 1006–1010) has a structure in which a pair of mesh form electrodes are arranged between the gimbal and the slider, and the actuator portion is produced by Ni plating, thereby promising good productivity.

However, since the weight of the slider portion is too large as compared with the electrostatic force generated, resonance occurs at around 1 to 2 kHz, so that the servo band cannot be enlarged.

As a countermeasure against this problem, it may be contemplated, for example, to make the actuator itself as a capacitor and feed back the signal; however, such an approach would complicate the system itself. Thus, this system has not yet been put to practical use.

The conventional micro-actuator utilizing the piezoelectric material of type (2) above (Evans et al., IEEE TRANSACTIONS ON MAGNETICS, Vol. 35, No. 2, March 1999, pp. 977–982) has, for example, a structure in which two piezoelectric elements are disposed in a pair in the vicinity of a voice coil motor arm of the suspension. When voltages are impressed in such directions that the piezoelectric element on one side extends and the piezoelectric element on the other side contracts, the head is rotated in the direction of the piezoelectric element on which the voltage in the contracting direction is impressed.

In the conventional actuator utilizing the piezoelectric elements, however, depolarization of the piezoelectric elements occurs due to time variation or the like, with the result that the displacement per voltage is reduced gradually. Therefore, there is the problem that a predetermined stroke cannot be obtained after use for a somewhat long time.

Furthermore, the conventional actuator utilizing the piezoelectric elements has the demerits of low productivity and high cost. Because of the above-mentioned problems, the actuator utilizing the piezoelectric elements has not yet been put to practical use.

The mechanism utilizing the electromagnetic force of type (3) above promises a high productivity due to simplification of structure, a comparatively large stroke, and a high reliability. A conventional micro-actuator utilizing the electromagnetic force in which a tip end portion of an arm of a voice coil motor being a coarse actuator is made to be a stator of the micro-actuator and a suspension rotatably attached to the tip end of the arm is made to be a rotor, has been proposed (Koganezawa et al., IEEE TRANSACTIONS ON MAGNETICS, Vol. 32, No. 5, September 1996, pp. 3908–3910). However, such a structure in which a shaft and the like are provided has the problem that the structure of an attachment portion is complicated and the productivity is low.

Furthermore, a micro-actuator has hitherto been proposed in which a stator is provided on a load beam, and a slider mounted on the tip end of a suspension via a hinge is driven by a long rotor extending from the stator portion to an upper portion of the slider (U.S. Pat. No. 6,295,185). In such a structure, however, compatibility of elasticity in the driving direction and translational rigidity in the vertical direction are difficult to secure for the hinge, so that resonance would occur in a low frequency region, and servo band cannot be enhanced. Further, since the rotor makes frictional contact with the load beam or the like at least in the vicinity of the hinge, it is inappropriate to mount such an actuator in the inside of the magnetic recording disk drive in which a clean atmosphere must be maintained.

On the other hand, a micro-actuator has hitherto been proposed in which both sides of a rotor disposed between a slider and a gimbal and so fixed as to surround the slider are connected to an attachment portion for attachment to the gimbal through very small leaf springs (called micro-beams) (U.S. Pat. No. 6,078,473).

In this actuator, a stator is disposed at the attachment portion for attachment to the gimbal or at the gimbal portion. In this structure, by regulating the material for the micro-beams, the number of the micro-beams, the aspect ratio of the section of the micro-beams, and the like, it is possible to simultaneously secure both elasticity in the driving direction and translational rigidity in the other directions, so that the servo band of the actuator can be enlarged, and positioning precision can be enhanced.

However, the micro-beams of the micro-actuator are produced as one body with the slider attachment portion and the rotor portion by deep etching of a single crystal of silicon, and the etching depth is as large as 100 to 200 µm, so that the productivity is low.

SUMMARY OF THE INVENTION

Accordingly, it is an object of the present invention to provide a micro-actuator for a magnetic recording disk drive which has a novel structure comprising a gimbal, micro-beams and a rotor portion formed as one body with each other and which is produced by a simple technique.

The present invention has been completed as a result of earnest investigations for attaining the above object. In accordance with the present invention, the following magnetic head actuators are provided.

[I] A magnetic head actuator for a magnetic recording disk drive, comprising a micro-actuator which is provided at a tip end portion of a load beam attached to an arm of a voice coil motor and which is for oscillating a magnetic head slider, wherein one end of the micro-actuator is fixed to a stator portion fixed on the load beam, a gimbal portion and a rotor portion oscillatably supported by metallic micro-beams formed by bending are provided on the side of the other end of the micro-actuator, the magnetic head slider is attached to the gimbal portion, either one of a permanent magnet and a coil is disposed at the stator portion, the other of the permanent magnet and the coil is disposed at the rotor portion, and the rotor portion and the magnetic head slider attached to the gimbal portion as one body with the rotor portion are oscillated by passing an electric current to the coil in a magnetic field formed by the permanent magnet.

[II] A magnetic head actuator as set forth in [I] above, wherein a pair of the micro-beams are disposed on both sides of the rotor portion and the gimbal portion, support the magnetic head slider through the gimbal portion, are sufficiently displaced in a tracking direction of a disk by a driving force generated by the stator portion and the rotor portion, and have high rigidity in the other directions.

[III] A magnetic head actuator for a magnetic recording disk drive, comprising a micro-actuator which is provided at a tip end portion of a load beam attached to an arm portion of a voice coil motor and which is for oscillating a magnetic head slider, wherein a stator portion is provided at one end of the micro-actuator in a gimbal portion, a slider attachment portion and a rotor portion oscillatably supported by metallic micro-beams formed by bending are provided on the side of the other end of the micro-actuator, a magnetic head slider is attached to the slider attachment portion, either one of a permanent magnet and a coil is disposed at the stator portion, the other of the permanent magnet and the coil is disposed at the rotor portion, and the rotor portion and the magnetic head slider attached to the slider attachment portion as one body with the rotor portion are oscillated by passing an electric current to the coil in a magnetic field formed by the permanent magnet.

[IV] A magnetic head slider as set forth in [III] above, wherein a pair of the micro-beams are disposed on both sides of the rotor portion and the slider attachment portion, support the magnetic head slider through the slider attachment portion, are sufficiently displaced in a tracking direction of a disk by a driving force generated by the stator portion and the rotor portion, and have high rigidity in the other directions.

[V] A magnetic head actuator as set forth in any one of [I] to [IV] above, wherein the micro-beams are integral with a fixing portion for fixing to the load beam, the rotor portion and the gimbal portion, and comprises at least one folded-back portion.

[VI] A magnetic head actuator as set forth in any one of [I] to [V] above, wherein a ferromagnetic alloy is used for the load beam so as to form a magnetic circuit.

[VII] A magnetic head actuator as set forth in any one of [I] to [VI] above, wherein a ferromagnetic alloy is used for the rotor portion so as to form a magnetic circuit.

In accordance with the present invention, it is possible to provide a magnetic head actuator which is high in reliability, is simple in structure, and can achieve accurate positioning. Furthermore, by simplifying the structure of the micro-actuator, productivity of the magnetic head actuator can be enhanced.

BRIEF DESCRIPTION OF THE DRAWINGS

FIGS. 5A to 5C are perspective views of one example of processing and deformation of a micro-actuator according to the first embodiment, in which FIG. 5A shows the condition where a sheet is blanked by press working or etching, FIG. 5B shows the conditions where the sheet of FIG. 5A is bent in directions A to D, and FIG. 5C shows the condition where the sheet of FIG. 5B is folded in direction F;

FIGS. 6A to 6C are perspective views of another example of processing and deformation of the micro-actuator according to the first embodiment, in which FIG. 6A shows the condition where a sheet is blanked by press working or etching, FIG. 6B shows the condition where the sheet of FIG. 6A is folded in direction H, and FIG. 6C shows the conditions where the sheet of FIG. 6B is bent in directions I to L;

DESCRIPTION OF THE PREFERRED EMBODIMENTS

Now, specific embodiments of the magnetic head actuator according to the present invention will be described in detail below.

FIGS. 1 to 14 show specific embodiments of: a magnetic head actuator for a magnetic recording disk drive, comprising a micro-actuator which is provided at a tip end portion of a load beam attached to an arm of a voice coil motor and which is for oscillating a magnetic head slider, wherein one end of the micro-actuator is fixed to a stator portion fixed to the load beam, a gimbal portion and a rotor portion oscillatably supported by metallic micro-beams formed by bending are provided on the side of the other end of the micro-actuator, the magnetic head slider is attached to the gimbal portion, a permanent magnet is disposed at the stator portion, a coil is disposed at the rotor portion, and the rotor portion and the magnetic head slider attached to the gimbal portion as one body with the rotor portion are oscillated by passing an electric current to the coil in a magnetic field formed by the permanent magnet(s); and a magnetic head actuator for a magnetic recording disk drive, comprising a micro-actuator which is provided at a tip end portion of a load beam attached to an arm portion of a voice coil motor and which is for oscillating a magnetic head slider, wherein a stator portion is provided at one end of the micro-actuator in the gimbal portion, a slider attachment portion and a rotor portion oscillatably supported by metallic micro-beams formed by bending are provided on the side of the other end of the micro-actuator, the magnetic head slider is attached to the slider attachment portion, a permanent magnet is disposed at the stator portion, a coil is disposed at the rotor portion, and the rotor portion and the magnetic head slider attached to the slider attachment portion as one body with the rotor portion are oscillated by passing an electric current to the coil in a magnetic field formed by the permanent magnet.

Figure 1:
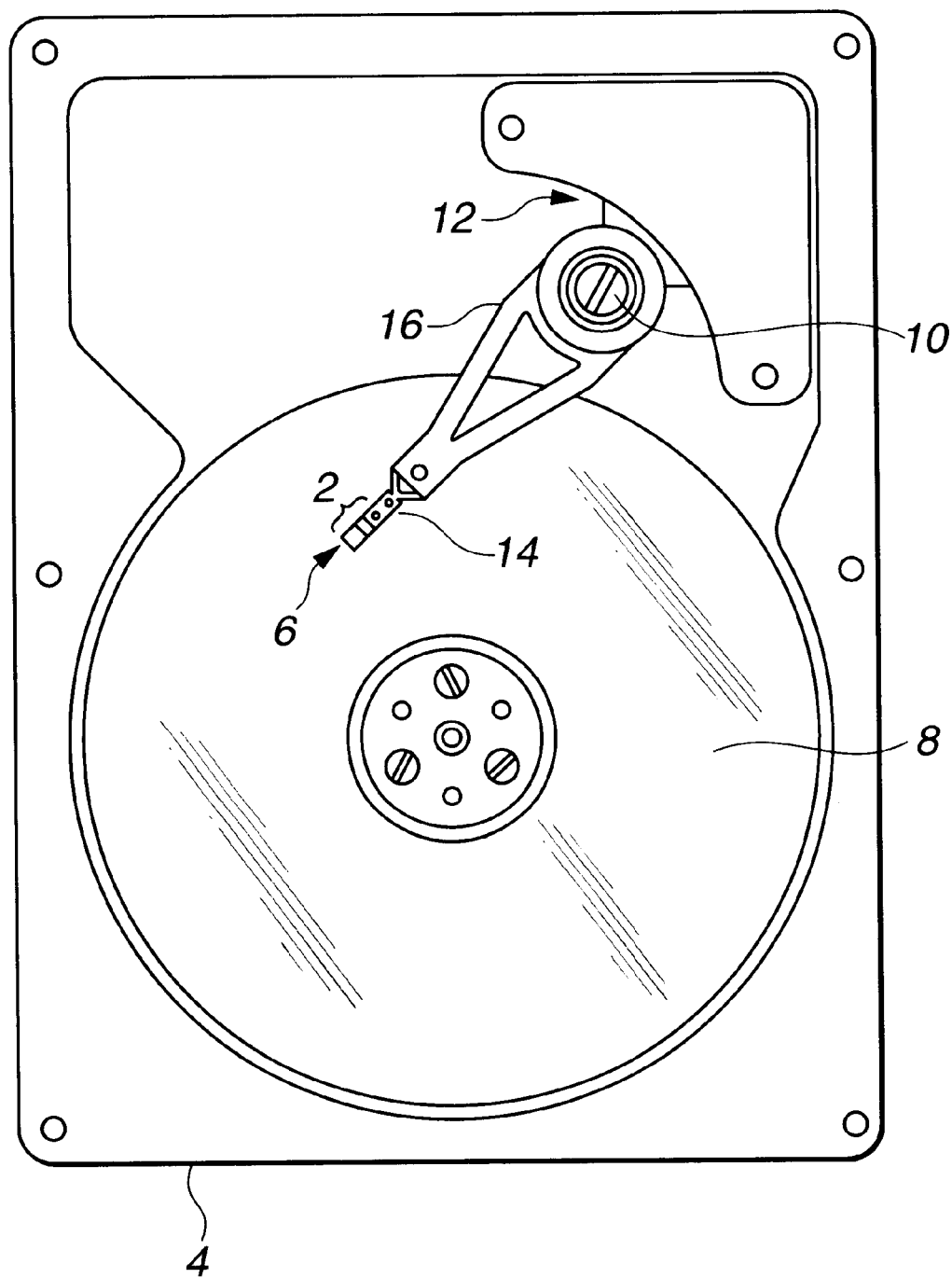
FIG. 1 is a plan view of a magnetic recording disk drive comprising a magnetic head actuator according to a first embodiment of the present invention.

FIG. 1 is a plan view showing one example of a magnetic recording disk drive 4 comprising the magnetic head actuator 2 according to the present invention. In this example, a coarse actuator for positioning a magnetic head slider 6 to a predetermined track on a disk 8 is comprised of a voice coil motor (VCM) 12 comprising an arm 16 moved with a pivot rotational shaft 10 as a center. A load beam 14 is attached to a tip end portion of the voice coil motor arm 16.

Figure 2:
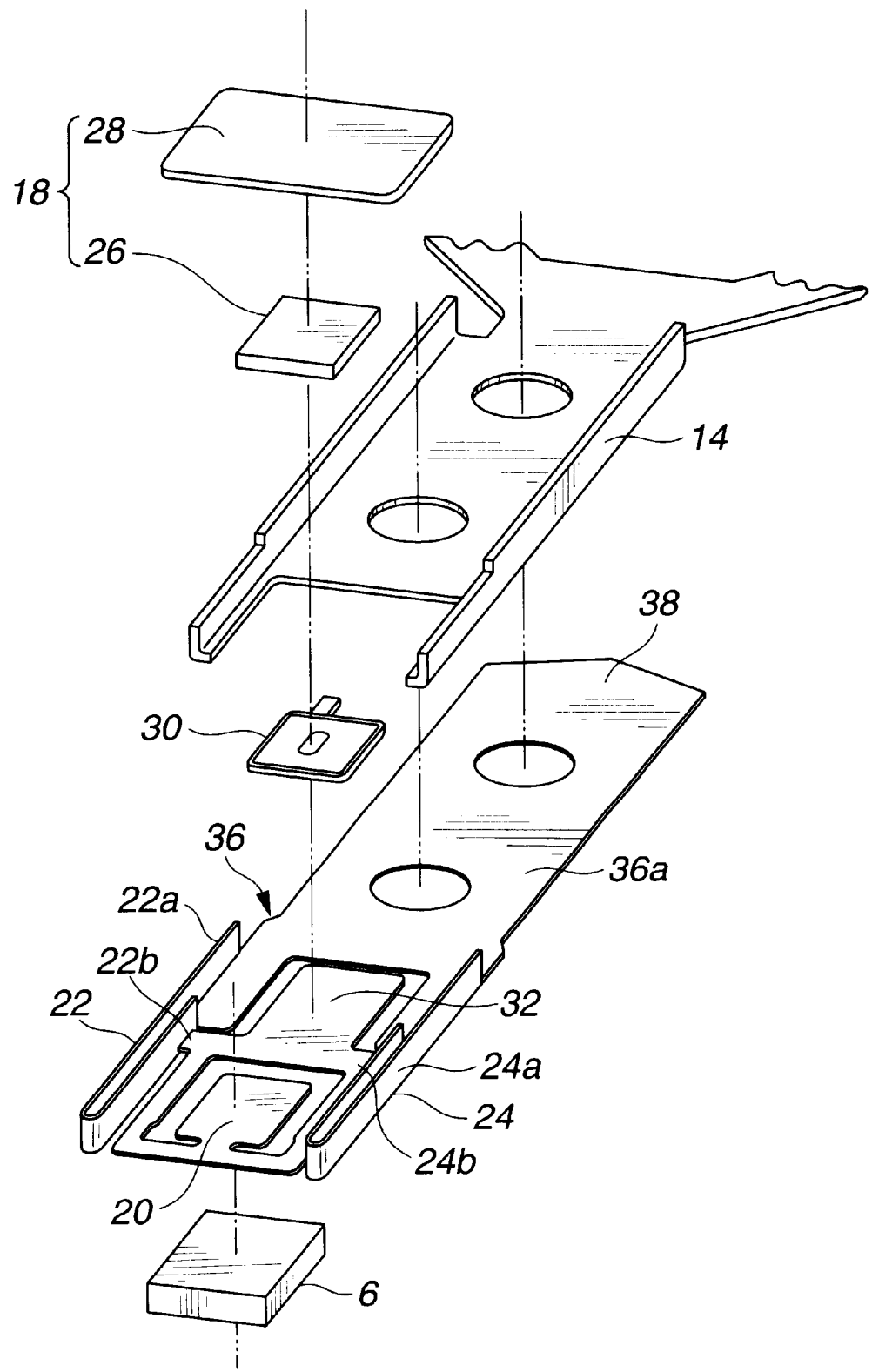
FIG. 2 is an exploded perspective view of the magnetic head actuator according to the first embodiment.
Figure 3:
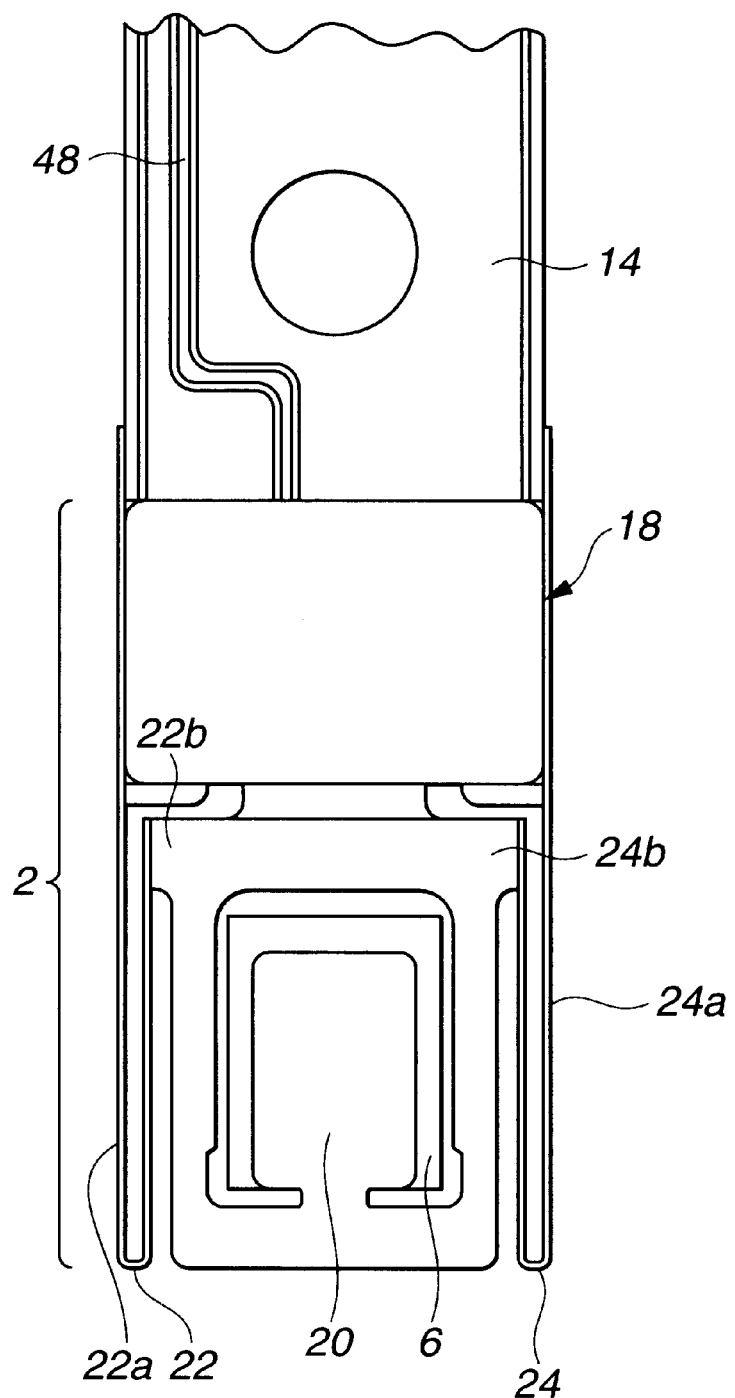
FIG. 3 is a plan view of the magnetic head actuator according to the first embodiment.

FIG. 2 shows an exploded perspective view of the magnetic head actuator portion according to the present invention, and FIG. 3 shows a plan view of the same portion after assembly, in which signal conductors for a magnetic head are not shown, for simplification.

As shown in FIG. 2, a stator portion 18 of a micro-actuator is provided at a tip end portion of the load beam 14, and, further, a component part (micro-actuator 36) constituting a gimbal portion 20, micro-beams 22 and 24, and a rotor portion 32 of the micro-actuator is attached to the tip end portion. A head slider 6 comprising a magnetic head (not shown) for reading/writing of data on the magnetic recording disk is attached to the tip end of the micro-actuator. Since the voice coil motor is so operated that the arm is moved with the pivot rotational shaft 10 as a center, the slider can be roughly moved to a predetermined track on the magnetic recording disk.

More in detail, the micro-beams 22 and 24 each have a structure in which long pieces 22a and 24a connected respectively integrally to both end edges of a tip end portion of a micro-actuator main body 36a are bent substantially perpendicularly to the side of the load beam 14 along both side edges, the long pieces 22a and 24a are folded back by substantially 180° to the inside at the tip end position of the micro-actuator main body 36a, and the gimbal portion 20 and the rotor portion 32 are connected integrally to the tip ends of the long pieces 22a and 24a through joint portions 22b and 24b, respectively.

As best shown in FIG. 2, the magnetic head actuator according to one embodiment of the present invention has a structure in which a magnetic circuit with a permanent magnet 26 provided at the tip end of the load beam 14 being fixed to a yoke 28 and a micro-actuator 36 having the coil 30 and the head slider 6 fixed respectively to the rotor portion 32 and the gimbal portion 20 are arranged opposite to each other.

Figure 4:
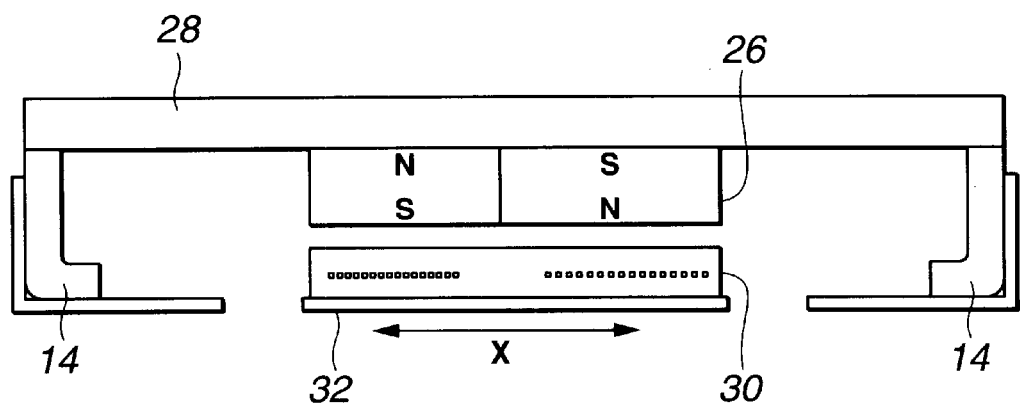
FIG. 4 is a sectional view of stator and rotor portions according to the first embodiment.

As shown in FIG. 4, the permanent magnet 26 is magnetized in a direction perpendicular to the plane of the coil 30 opposed thereto, and is magnetized to have two poles at the left and the right as viewed from the front surface of the slider. In place of this, two permanent magnets each magnetized to have a single pole may be arranged side by side. The permanent magnet 26 has a size at the magnetic pole surface of 0.5 to 2.5 mm, and a thickness in the magnetization direction of 0.05 to 0.25 mm. The magnetic force generated by the permanent magnet 26 has a great influence on the driving force of the magnetic head actuator according to the present invention. In order to obtain a sufficient magnetic force with the above-mentioned dimensions, it is desirable to use a powerful rare earth magnet such as an Nd—Fe—B based sintered magnet.

The yoke 28 is formed of a ferromagnetic material such as steel, and has a thickness of 0.05 to 0.25 mm. The permanent magnet 26, the yoke 28 and the load beam 14 are fixed by, for example, an epoxy based adhesive or by soldering, welding or the like.

It is desirable to use a flexible printed wiring board for the coil 30. The coil 30 is so wound as to generate a magnetic field perpendicular to the magnetic pole surface of the permanent magnet 26 opposed thereto, and a wiring portion 48 for introducing an electric current to the coil 30 is provided at one end of the coil 30. While a one-layer circuit pattern is shown for simplicity in FIG. 4, a multiplayer wiring board may be used according to the magnetic force, or driving force, required. For fixing of the coil 30 to the micro-actuator 36, for example, an epoxy based adhesive or the like is used. The electric current introduction wiring portion 48 is fixed to the load beam 14 with a little flexure, so as not to hinder oscillation of the magnetic head actuator.

The micro-actuator 36 comprised of the attachment portion 38 for attachment to the load beam 14, the micro-beams 22 and 24, the gimbal portion 20 and the rotor portion 32 is formed of a steel based spring material, in the same manner as a gimbal in the conventional VCM, and has a thickness of about 0.025 to 0.1 mm. A ferromagnetic material may be used for the purpose of constituting a part of the magnetic circuit.

As best shown in FIG. 2, the micro-actuator 36 comprises a pair of the micro-beams 22 and 24 between the attachment portion 38 for attachment to the load beam and the rotor portion 32 and the gimbal portion 20. The micro-beams 22 and 24 extend from the side of the load beam 14 toward the side of the head slider 6, are once bent at the tip ends thereof, and return to the side of the load beam 14, where they support the rotor portion 32 and the gimbal portion 20. This structure has the same effect as an arrangement of two beams on one side, and makes it possible to maintain high rigidity in the vertical direction and the like directions while enhancing elasticity in the driving direction of the magnetic head actuator, as compared with the case of one beam. Two or more bend points may be provided, for obtaining predetermined elasticity and translational rigidity.

As shown in FIG. 4, the driving portion of the magnetic head actuator according to the present invention has the same basic structure as that of a VCM, which is a coarse actuator. With an electric current passed to the coil 30, a magnetic field is generated in the vertical direction relative to the sheet of paper, and attractive/repelling forces between this magnetic field and a magnetic field formed by the permanent magnet 26 oscillate the rotor portion 32 in the directions of arrow X, and the head slider 6 with the magnetic head mounted thereon is also oscillated as one body with the rotor portion 32.

Figure 5A:
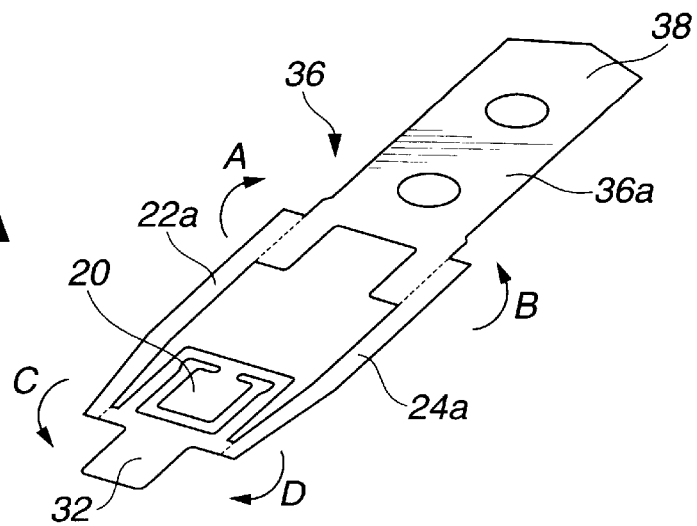
Figure 5B:
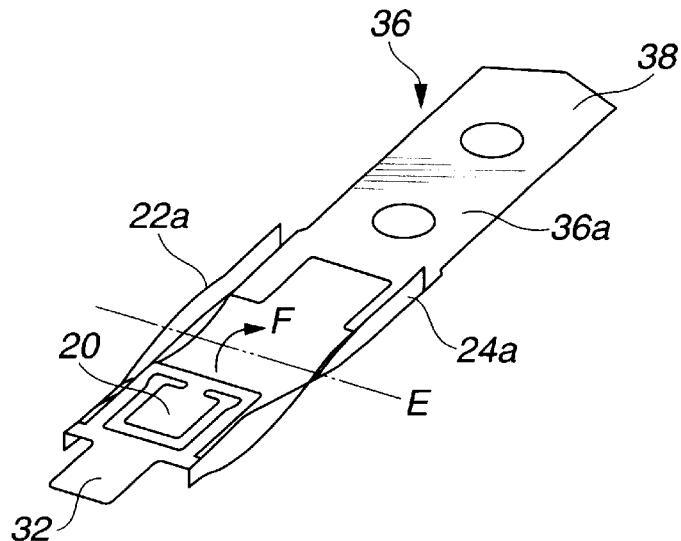
Figure 5C:
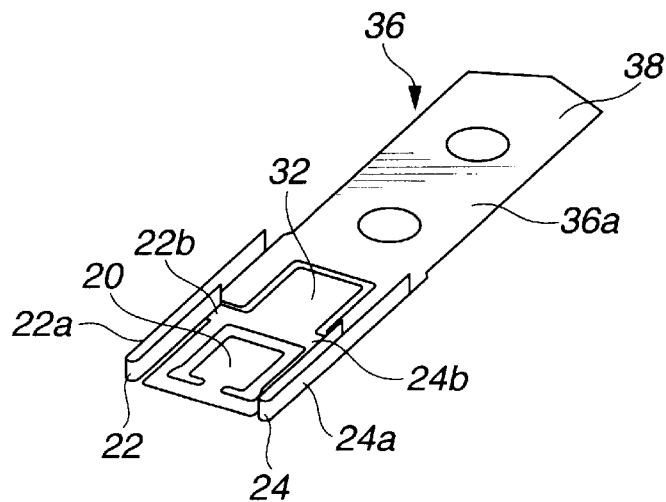

The micro-beams 22 and 24 are produced by blanking a sheet by press working or etching in the same manner as the gimbal in the conventional suspension, and then bending the blanked sheet. In this case, the manner of processing and deformation is as shown in FIG. 5. First, the micro-actuator 36 after blanking the sheet by press working or etching is as shown in FIG. 5A, in which the positions of the rotor portion 32 and the gimbal portion 20 are reversed relative to the attachment portion 38 for attachment to the load beam. Both ends on the side of a fixing portion for fixing to the load beam are bent perpendicularly in the manner of forming a valley as indicated by arrows A and B, and the sides of the rotor portion and the gimbal portion are bent in the manner of forming a ridge as indicated by arrows C and D. As a result, two micro-beams are twisted, as shown in FIG. 5B. Next, the rotor portion 32 and the gimbal portion 20 are rotated by 180° as indicated by arrow F with the straight line E connecting between the midpoints of the micro-beams as an axis of rotation, and the midpoint portions of the micro-beams are bent at an appropriate curvature in the manner of folding back the micro-beams, resulting in the condition shown in FIG. 5C. In order to perform the series of processing with high accuracy, bending lines may be preliminarily provided at the portions to be bent.

Figure 6A:
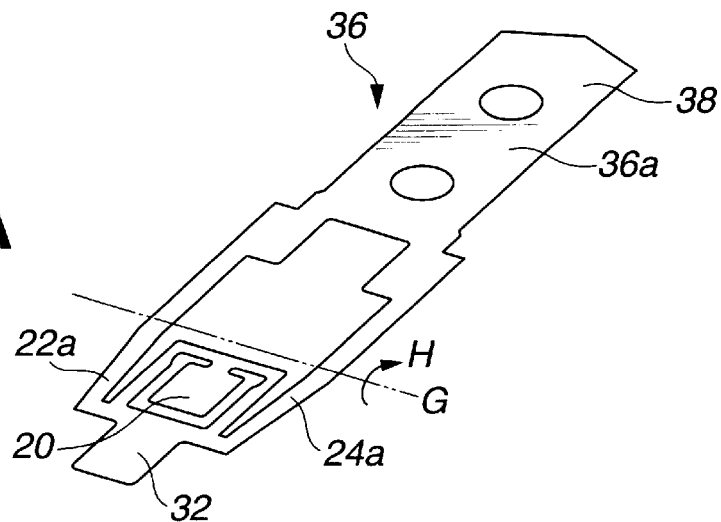
Figure 6B:
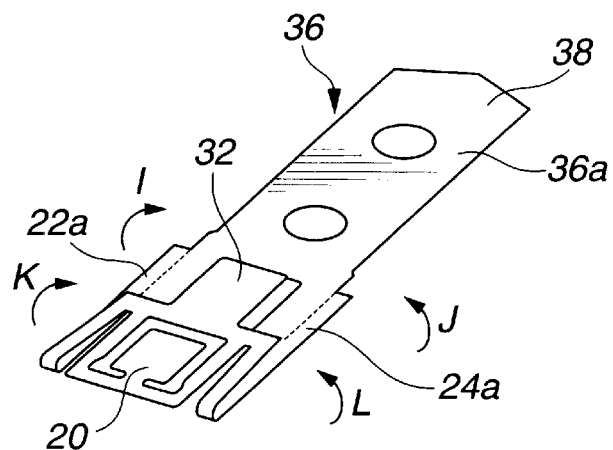
Figure 6C:
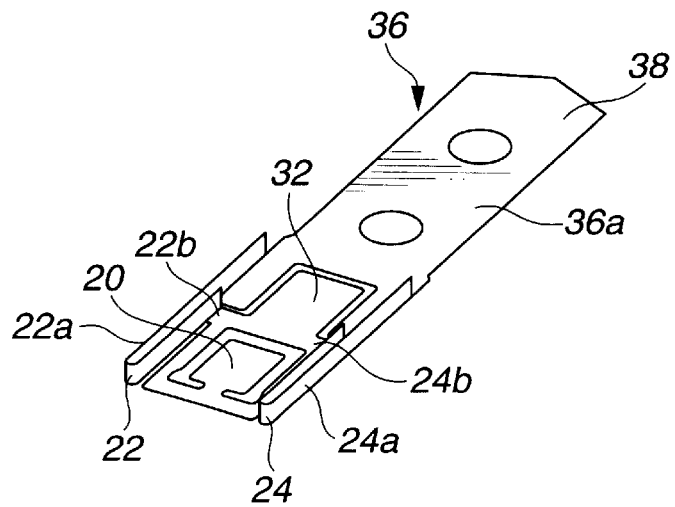

FIG. 6 shows the manner of another example of processing and deformation. Of the micro-actuator 36 after blanking the sheet by press working or etching, as shown in FIG. 6A, folding-back portions of the micro-beams indicated by straight line G are bent at a predetermined curvature as indicated by arrow H. Next, as shown in FIG. 6B, both ends on the side of the fixing portion for fixing to the load beam and the sides of the rotor portion and the gimbal portion are bent perpendicularly in the manner of forming a valley as indicated by arrows I, J, K, and L, resulting in the condition shown in FIG. 6C.

Figure 7:
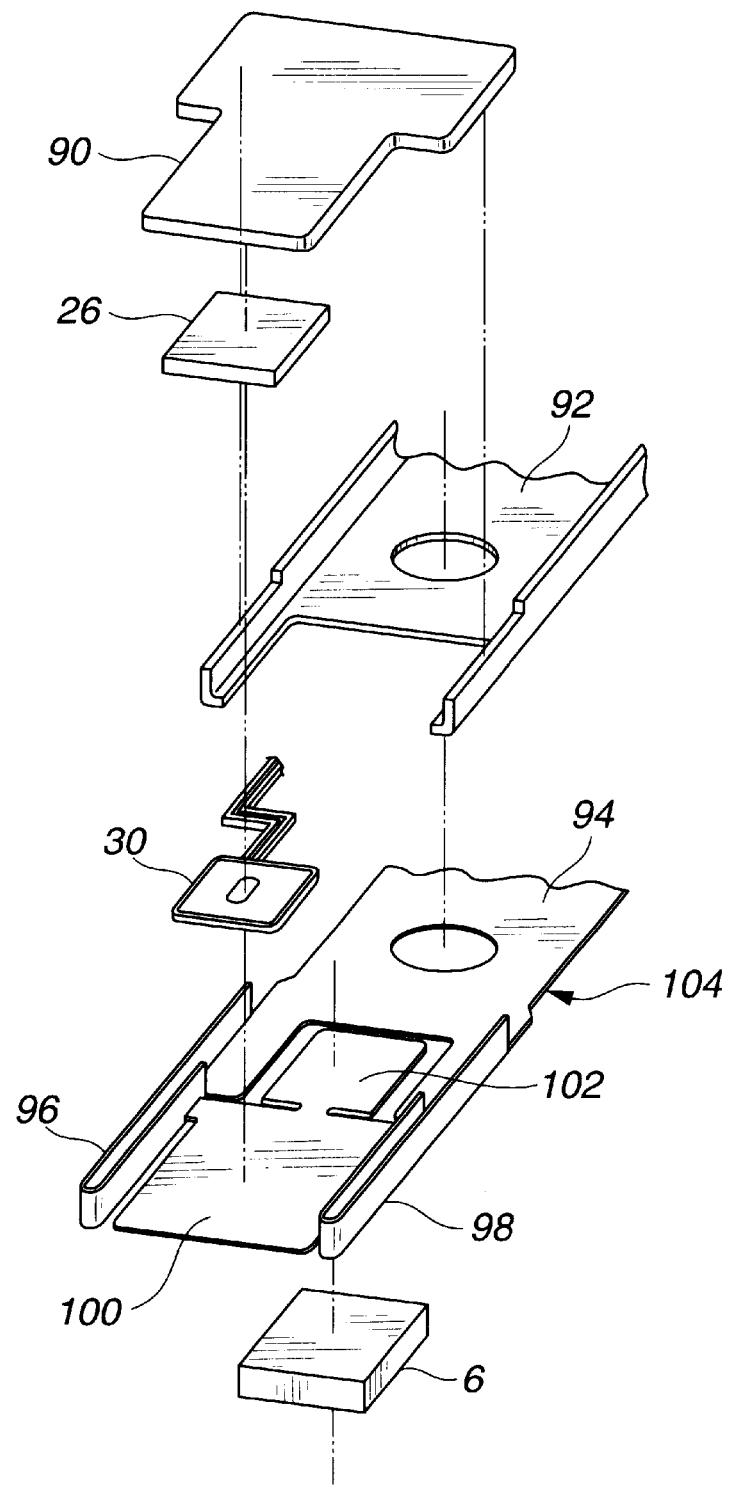
FIG. 7 is an exploded perspective view of a magnetic head actuator according to a second embodiment.

FIG. 7 shows an exploded perspective view of a magnetic head actuator according to a second embodiment of the present invention. In this embodiment, a rotor portion 100 is provided between micro-beams 96 and 98, and a gimbal portion 102 is provided on the rear side of the rotor portion 100, i.e., on the side of an attachment portion 94 for attachment to the load beam. By the amount by which the rotor portion 100 where a coil 30 is provided is moved toward the front side, a yoke 90 for arrangement of a permanent magnet 26 is also projected toward the front side. In FIG. 7, numeral 92 denotes the load beam, and 104 denotes the micro-actuator.

Figure 8:
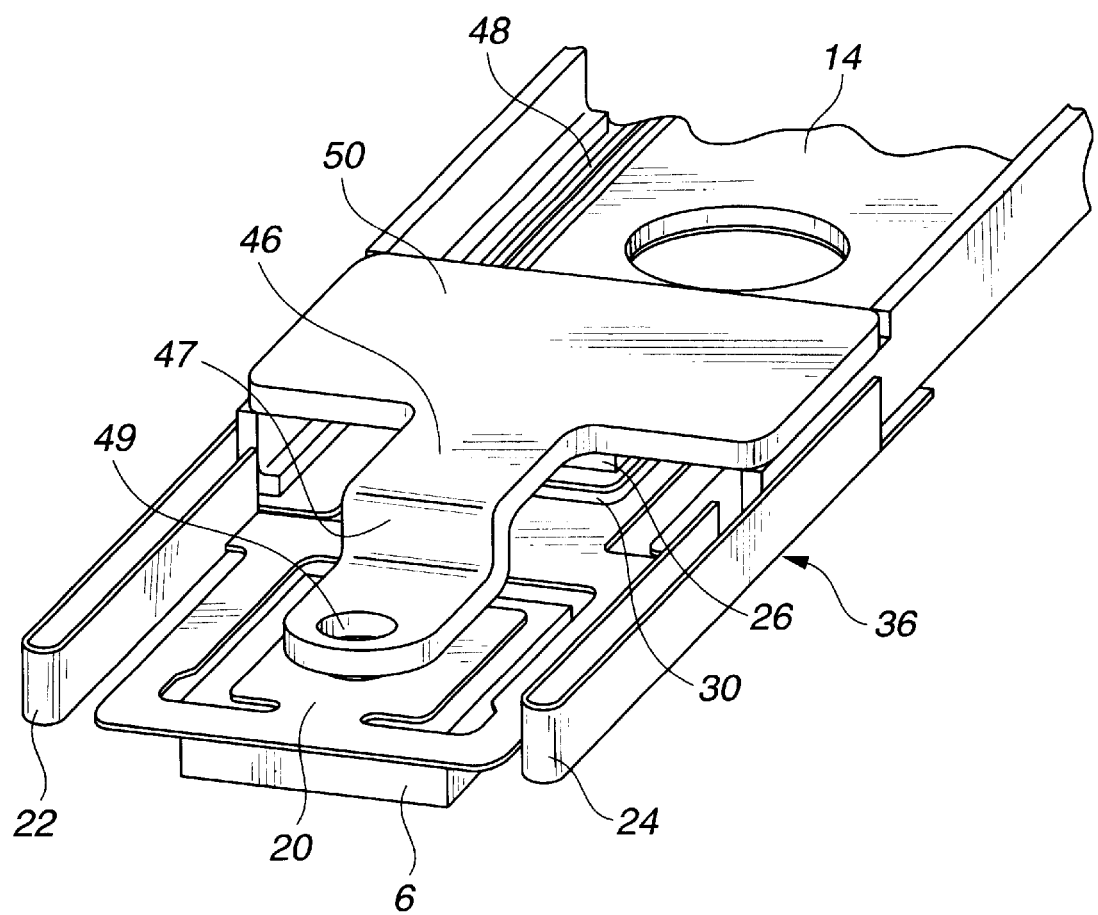
FIG. 8 is a perspective view of a magnetic head actuator according to a third embodiment.

FIG. 8 shows a perspective view of a magnetic head actuator according to a third embodiment of the present invention. In this embodiment, a beam 46 is attached to the front side of the yoke 50 in the first embodiment, and, further, a hollow 49 is provided at the tip end of the beam 46. The hollow 49 makes point contact with a gimbal portion 20 of a micro-actuator 36, and plays the role of exerting a pre-load on a head slider 6. If required, a bend portion 47 may be provided.

Figure 9:
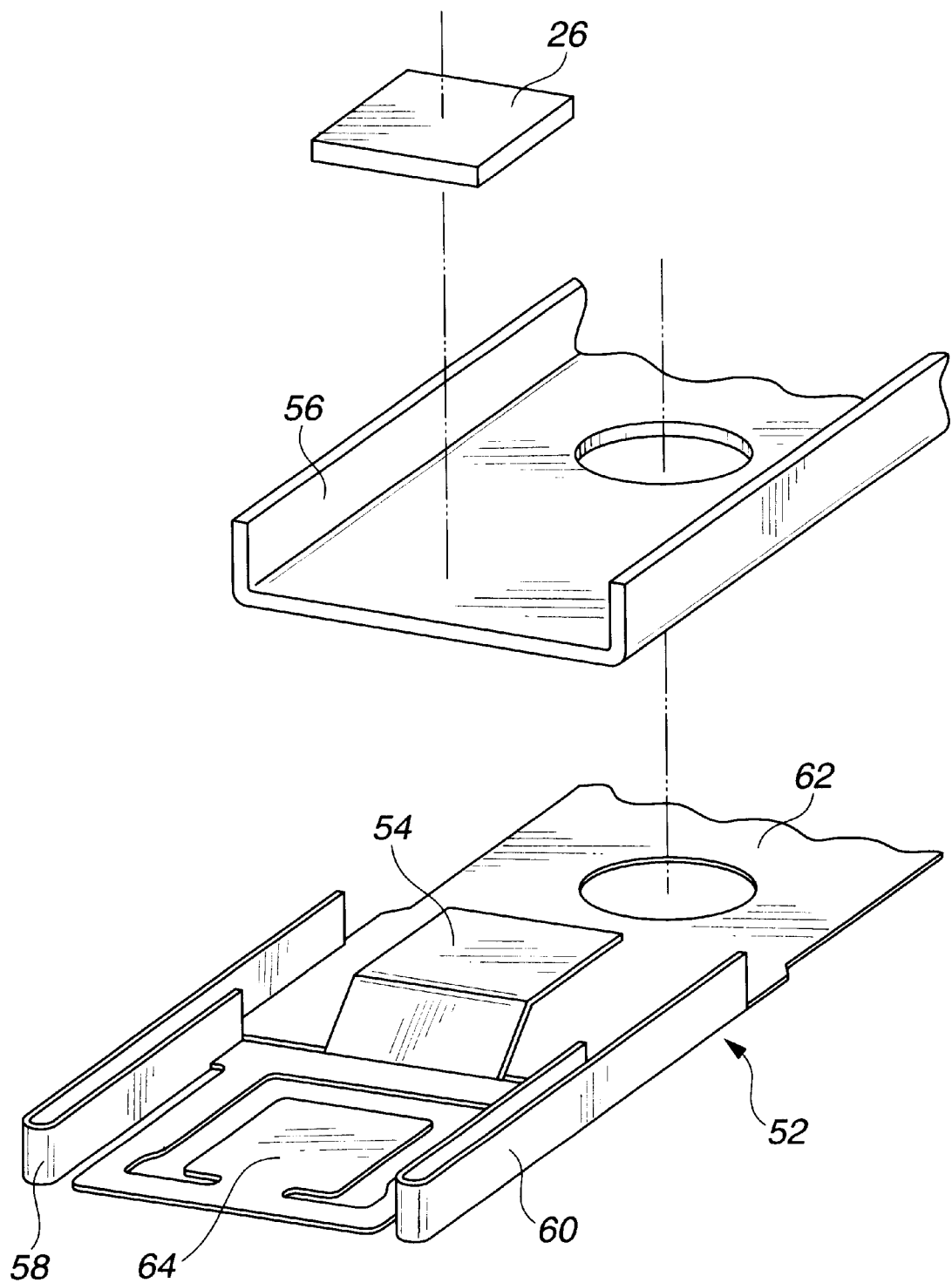
FIG. 9 is an exploded perspective view of a magnetic head actuator according to a fourth embodiment.
Figure 10:
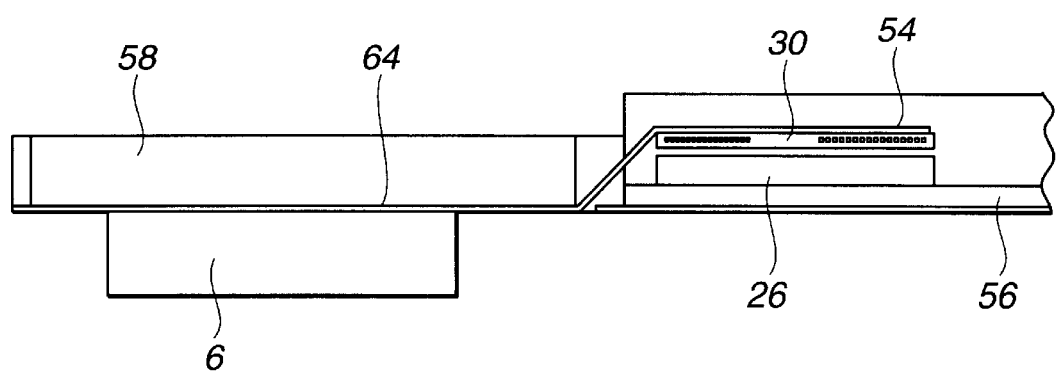
FIG. 10 is a sectional view of the magnetic head actuator according to the fourth embodiment.

Referring to FIG. 9, there is shown an exploded perspective view of a magnetic head actuator according to a fourth embodiment of the present invention. In this embodiment, a rotor portion 54 of a micro-actuator 52 is subjected to bending to be higher than a gimbal portion 64 by about 0.3 to 0.5 mm. A permanent magnet 26 is disposed at a load beam 56. Micro-beams 58 and 60 are so provided as to clamp the tip ends of the permanent magnet 26 and the load beam 56 between the rotor portion 54 and an attachment portion 62 for attachment to the load beam 56. FIG. 10 shows a partial sectional view of the fourth embodiment of the present invention. A coil 30, which has not been shown in FIG. 9 for simplification, is disposed at a surface of the rotor portion 54 on the permanent magnet side or the opposite side. The coil 30 may be disposed on both sides, for securing the number of turns. In the case of this embodiment, by using a ferromagnetic material for the load beam 56, the yoke of the permanent magnet which has been used in the first embodiment can be omitted.

Figure 11:
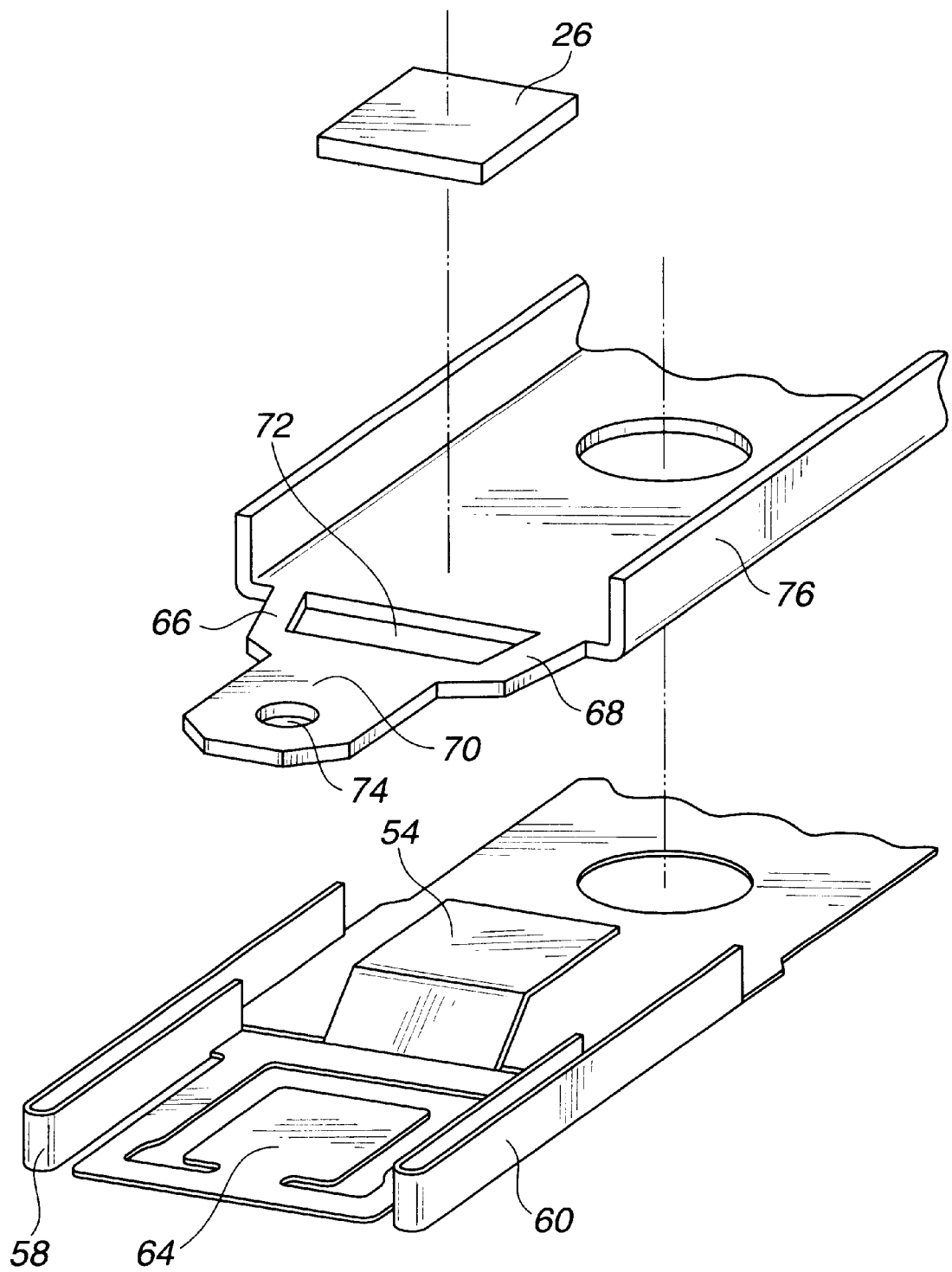
FIG. 11 is an exploded perspective view of a magnetic head actuator according to a fifth embodiment.
Figure 12:
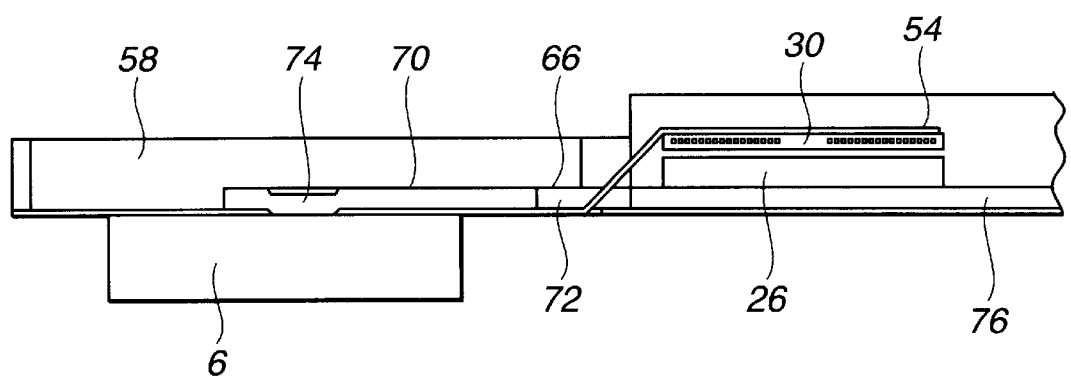
FIG. 12 is a sectional view of the magnetic head actuator according to the fifth embodiment.

Referring to FIG. 11, there is shown an exploded perspective view of a magnetic head actuator according to a fifth embodiment of the present invention. In this embodiment, a hole portion 72 formed by beams 66 and 68 extending from the left and the right and a flat portion 70 integrally projected in the manner of bridging the tip ends of the beams 66 and 68 is provided at the tip end of the load beam 76 in the fourth embodiment, and the flat portion 70 is provided with a hollow 74. A micro-actuator has its rotor portion 54 attached to the load beam 76 through the hole portion 72 of the load beam 76. FIG. 12 shows a partial sectional view of the fifth embodiment of the present invention. In the case of this embodiment, by using a ferromagnetic material for the load beam 76, the yoke of the permanent magnet which has been used in the first embodiment can be omitted, and, in addition, a pre-load can be exerted on a slider without increasing the number of component parts.

Figure 13:
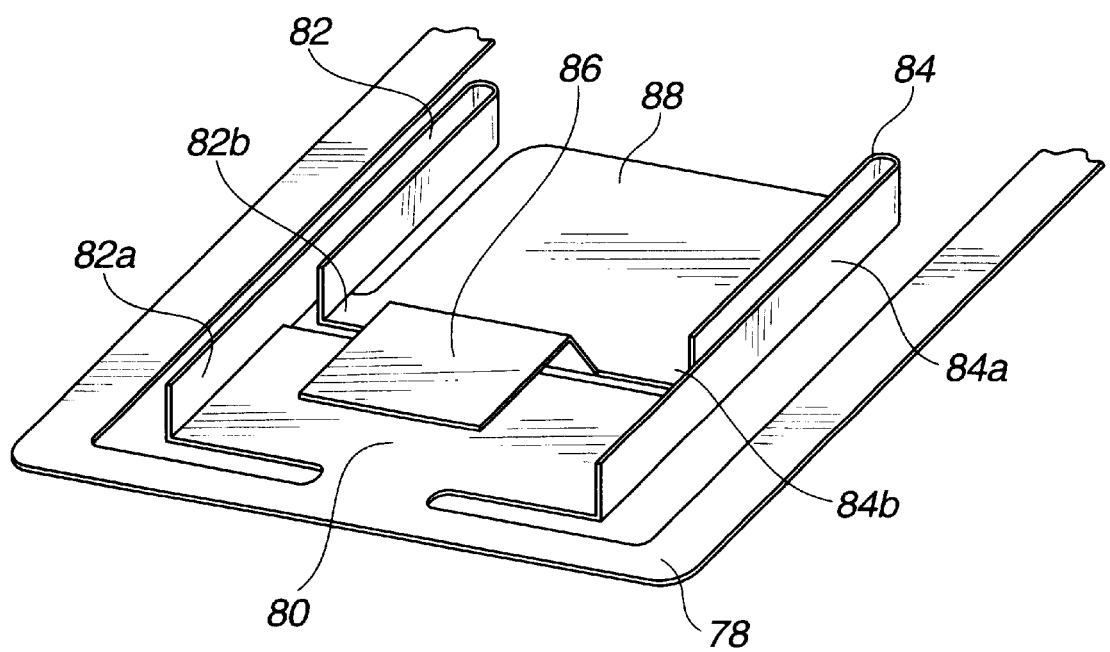
FIG. 13 is an enlarged perspective view of a micro-actuator according to a sixth embodiment.
Figure 14:
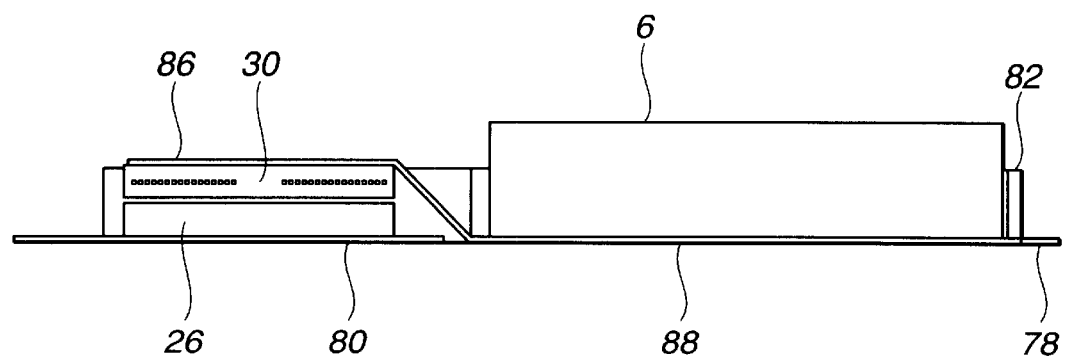
FIG. 14 is a sectional view of a magnetic head actuator according to the sixth embodiment.

Referring to FIG. 13, there is shown an enlarged perspective view of a tip end portion of a micro-actuator according to a sixth embodiment of the present invention. In this embodiment, a stator portion 80, micro-beams 82 and 84, a rotor portion 86 and a slider attachment portion 88 are disposed in the inside of a gimbal portion 78. FIG. 14 shows a partial enlarged sectional view of a magnetic head actuator according to the sixth embodiment of the present invention. For simplification, a load beam and a wiring are not shown in the figure. In the case of this embodiment, by containing the actuator in the gimbal portion, a further reduction in size can be achieved.

In this embodiment, the rotor portion 86 and the slider attachment portion 88 are integrally connected to the micro-beams 82 and 84 through joint portions 82b and 84b thereof. In this case, long pieces 82a and 84a forming the micro-beams 82 and 84 are integrally connected to both side edges of the stator portion 80, and are bent at the both side edges; in addition, the long pieces 82a and 84a are extended toward the rear side (the load beam side), and are folded back at predetermined extension positions, and the rotor portion 86 and the slider attachment portion 88 are integrally connected thereto through the joint portions 82b and 84b, as described above. Therefore, in this case, also, the same effects as those of the first to fifth embodiments are obtained.

FIGS. 15 to 25 show specific embodiments of: a magnetic head actuator for a magnetic recording disk drive, comprising a micro-actuator which is provided at a tip end portion of a load beam attached to an arm of a voice coil motor and which is for oscillating a magnetic head slider, wherein one end of the micro-actuator is fixed to a stator portion fixed to the load beam, a gimbal portion and a rotor portion oscillatably supported by metallic micro-beams formed by bending are provided on the side of the other end of the micro-actuator, the magnetic head slider is attached to the gimbal portion, a coil is disposed at a stator portion, a permanent magnet is disposed at the rotor portion, and the rotor portion and the magnetic head slider attached to the gimbal portion as one body with the rotor portion are oscillated by passing an electric current to the coil in a magnetic field formed by the permanent magnet; and a magnetic head actuator for a magnetic recording disk drive, comprising a micro-actuator which is provided at a tip end portion of a load beam attached to an arm portion of a voice coil motor and which is for oscillating a magnetic head slider, wherein a stator portion is provided at one end of the micro-actuator in the gimbal portion, a slider attachment portion and a rotor portion oscillatably supported by metallic micro-beams formed by bending are provided on the side of the other end of the micro-actuator, the magnetic head slider is attached to the slider attachment portion, a coil is disposed at the stator portion, a permanent magnet is disposed at the rotor portion, and the rotor portion and the magnetic head slider attached to the slider attachment portion as one body with the rotor portion are oscillated by passing an electric current to the coil in a magnetic field formed by the permanent magnet.

In these embodiments, the example of the magnetic recording disk drive comprising this magnetic head actuator is the same as that in FIG. 1. Besides, in FIGS. 15 to 25, the same component parts as those in FIGS. 1 to 14 are denoted by the same reference symbols as used above.

Figure 15:
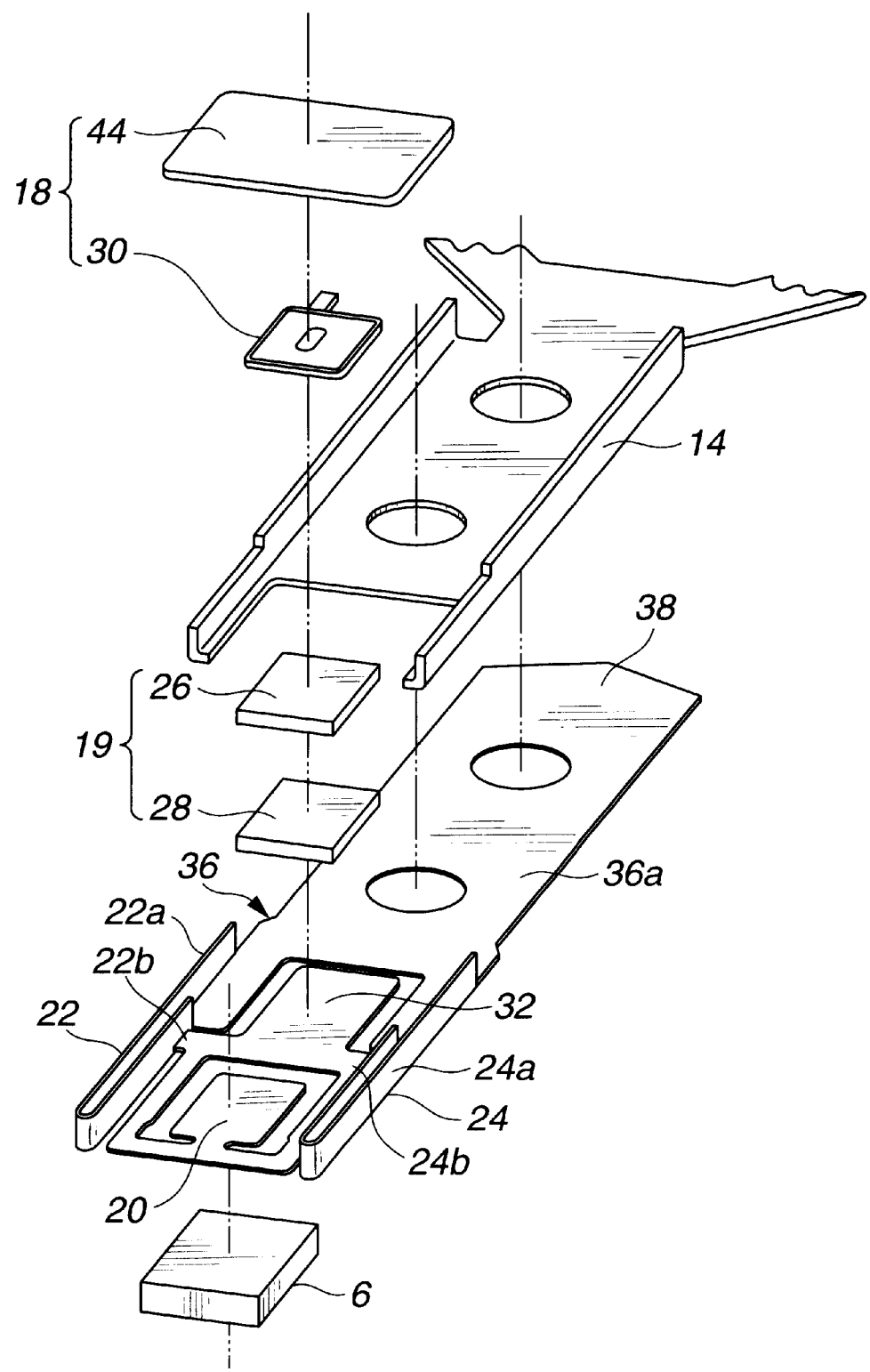
FIG. 15 is an exploded perspective view of a magnetic head actuator according to a seventh embodiment.
Figure 16:
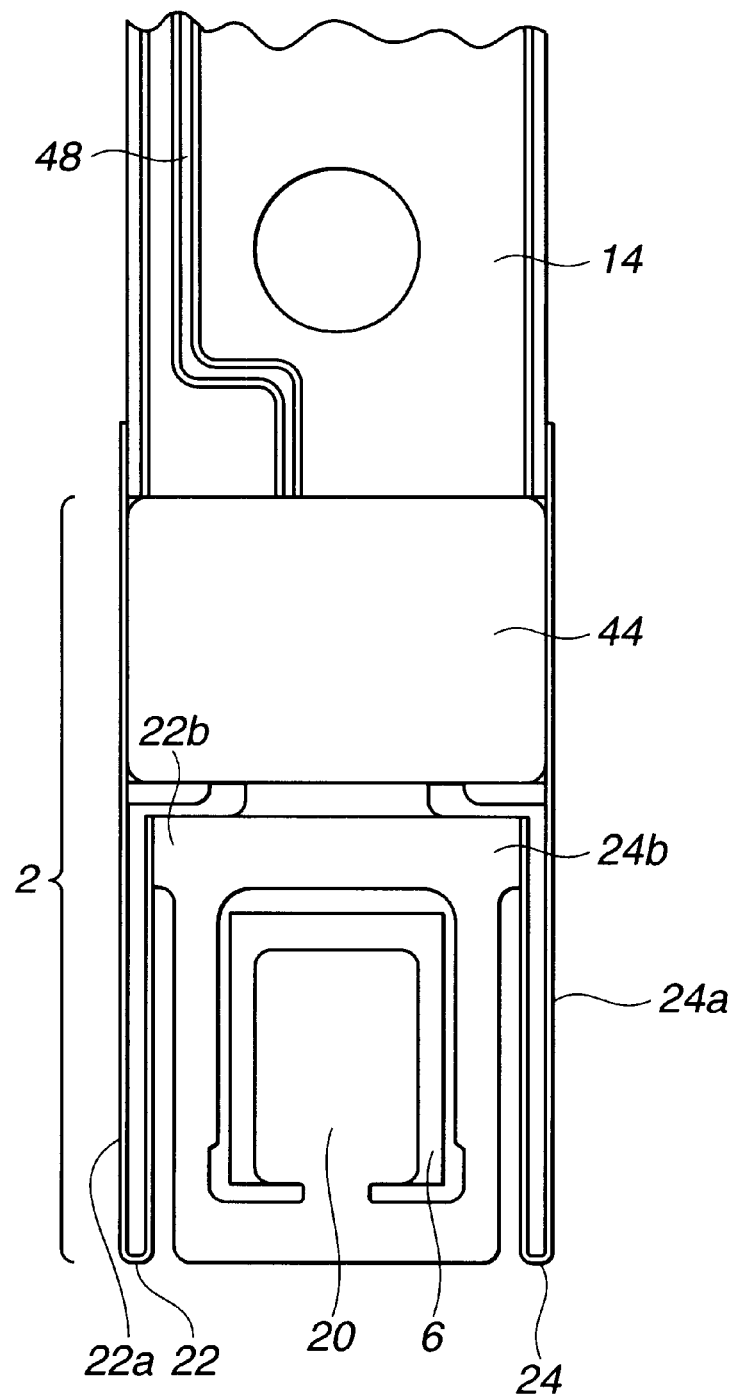
FIG. 16 is a plan view of the magnetic head actuator according to the seventh embodiment.
Figure 17:
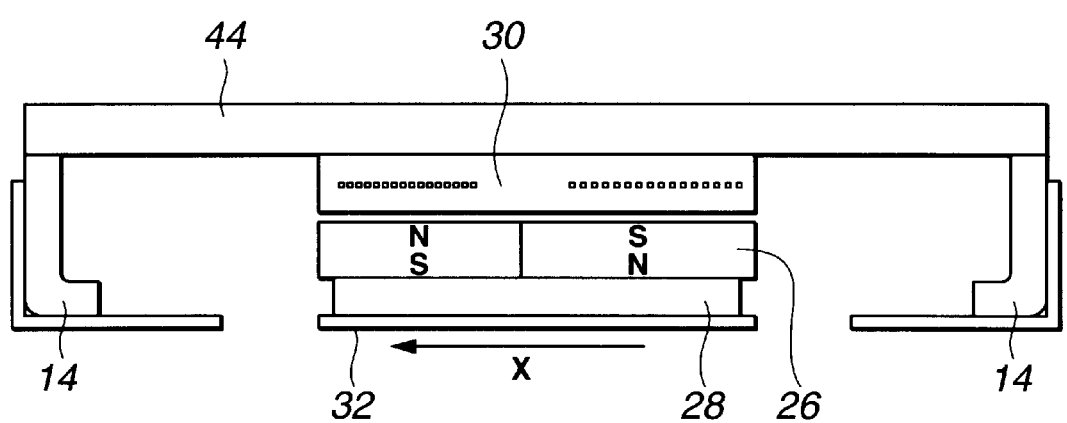
FIG. 17 is a sectional view of stator and rotor portions according to the seventh embodiment.

FIGS. 15 to 17 illustrate a magnetic head actuator according to a seventh embodiment of the present invention, in which FIG. 15 is an exploded perspective view, and FIG. 16 is a plan view of the same portion after assembly; in these figures, signal conductors of a magnetic head are not shown, for simplification.

As shown in FIG. 15, a stator portion 18 of a micro-actuator is provided at a tip end portion of a load beam 14, and, further, a component part (micro-actuator 36) constituting a gimbal portion 20, micro-beams 22 and 24, and a rotor portion 32 of the micro-actuator is attached to the tip end portion. A head slider 6 comprising a magnetic head (not shown) for performing reading/writing of data on a magnetic recording disk is attached to the tip end of the micro-actuator. A voice coil motor is so operated that an arm is moved with a pivot rotational shaft 10 as a center, so that the slider can be moved roughly to a predetermined track on the magnetic recording disk.

More in detail, the micro-beams 22 and 24 have a structure in which long pieces 22a and 24a integrally connected respectively to both side edges of a tip end portion of a micro-actuator main body 36a are bent substantially perpendicularly to the side of the load beam 14 along the both side edges, the long pieces 22a and 24a are folded back by 180° to the inside at the tip end position of the micro-actuator main body 36a, and the gimbal portion 20 and the rotor portion 32 are integrally connected to the tip ends of the long pieces 22a and 24a through joint portions 22b and 24b, respectively.

As best shown in FIG. 15, the magnetic head actuator according to one embodiment of the present invention has a structure in which a coil 30 provided at the lower surface of a fixing plate 44 in FIG. 15 at the tip end of the load beam 14 via the fixing plate 44 and the micro-actuator 36 comprising a magnetic circuit 19, with a permanent magnet 26 fixed to a yoke 28, and a head slider 6 fixed respectively to the rotor portion 32 and the gimbal portion 20 are arranged opposite to each other.

As shown in FIG. 17, the permanent magnet 26 is magnetized in a direction perpendicular to the plane of the coil 30 opposed thereto, and so magnetized as to have two poles at the left and the right as viewed from the front side of the slider. In place of this, two permanent magnets each magnetized to have a single pole may be arranged side by side. The permanent magnet 26 has a size at the magnetic pole surface of 0.5 to 2.5 mm, and a thickness in the magnetization direction of 0.05 to 0.25 mm. The magnetic force generated by the permanent magnet 26 has a great influence on the driving force of the magnetic head actuator according to the present invention. In order to obtain a sufficient magnetic force with the above-mentioned dimensions, it is desirable to use a powerful rare earth magnet such as an Nd—Fe—B based sintered magnet. For forming an efficient magnetic circuit, a yoke 28 formed of steel or the like and having a thickness of about 0.025 to 0.15 mm may be arranged between the permanent magnet 26 and the rotor portion 32. For fixing the permanent magnet 26 and the yoke 28 to the rotor portion 32, for example, an epoxy based adhesive or soldering, welding or the like is used.

It is desirable to use a flexible printed wiring board for the coil 30. The coil 30 is so wound as to generate a magnetic field perpendicular to the magnetic pole surface of the permanent magnet 26 opposed thereto, and a wiring portion 48 for introducing an electric current to the coil 30 is provided at one end of the coil 30. While a one-layer circuit pattern is shown in FIG. 17 for simplification, a multiplayer wiring board may be used according to the magnetic force, or driving force, required. For fixing the coil 30 and the current introduction wiring portion 48 to the fixing plate 44 and the load beam 14, for example, an epoxy based adhesive or the like is used. The fixing plate 44 and the load beam 14 are fixed, for example, by an epoxy based adhesive or by soldering, welding or the like.

The micro-actuator 36 comprised of the attachment portion 38 for attachment to the load beam 14, the micro-beams 22 and 24, the gimbal portion 20 and the rotor portion 32 is formed of a steel based spring material in the same manner as the gimbal in the conventional VCM, and has a thickness of about 0.025 to 0.1 mm. A ferromagnetic material may be used for the purpose of constituting a part of the magnetic circuit.

As best shown in FIG. 15, the micro-actuator 36 comprises a pair of the micro-beams 22 and 24 between the attachment portion 38 for attachment to the load beam and the rotor portion 32 and the gimbal portion 20. The micro-beams 22 and 24 extend from the side of the load beam 14 toward the side of a head slider 6, are once bent at the tip ends thereof, and return to the side of the load beam 14, where they support the rotor portion 32 and the gimbal portion 20. This structure has an effect equivalent to that of an arrangement of two beams on one side, and enables to maintain high rigidity in the vertical direction and the like directions while enhancing elasticity in the driving direction of the magnetic head actuator, as compared with the case of one beam. For obtaining predetermined elasticity and translational rigidity, two or more bend points may be provided.

As shown in FIG. 17, the driving portion of the magnetic head actuator according to the present invention has the same basic structure as that of a VCM, which is a coarse actuator. With an electric current passed to the coil 30, a magnetic field is generated in the vertical direction with respect to the sheet of paper, attractive/repelling forces between this magnetic field and the magnetic field generated by the permanent magnet 26 oscillate the rotor portion 32 in the directions of arrow X, and the head slider 6 with the magnetic head mounted thereon is also oscillated as one body with the rotor portion 32.

The micro-beams 22 and 24 are produced by blanking a sheet by press working or etching and then bending the blanked sheet, in the same manner as the gimbal in the conventional VCM. The manner of processing and deformation in this case is the same as in the case shown in FIGS. 5 and 6.

Figure 18:
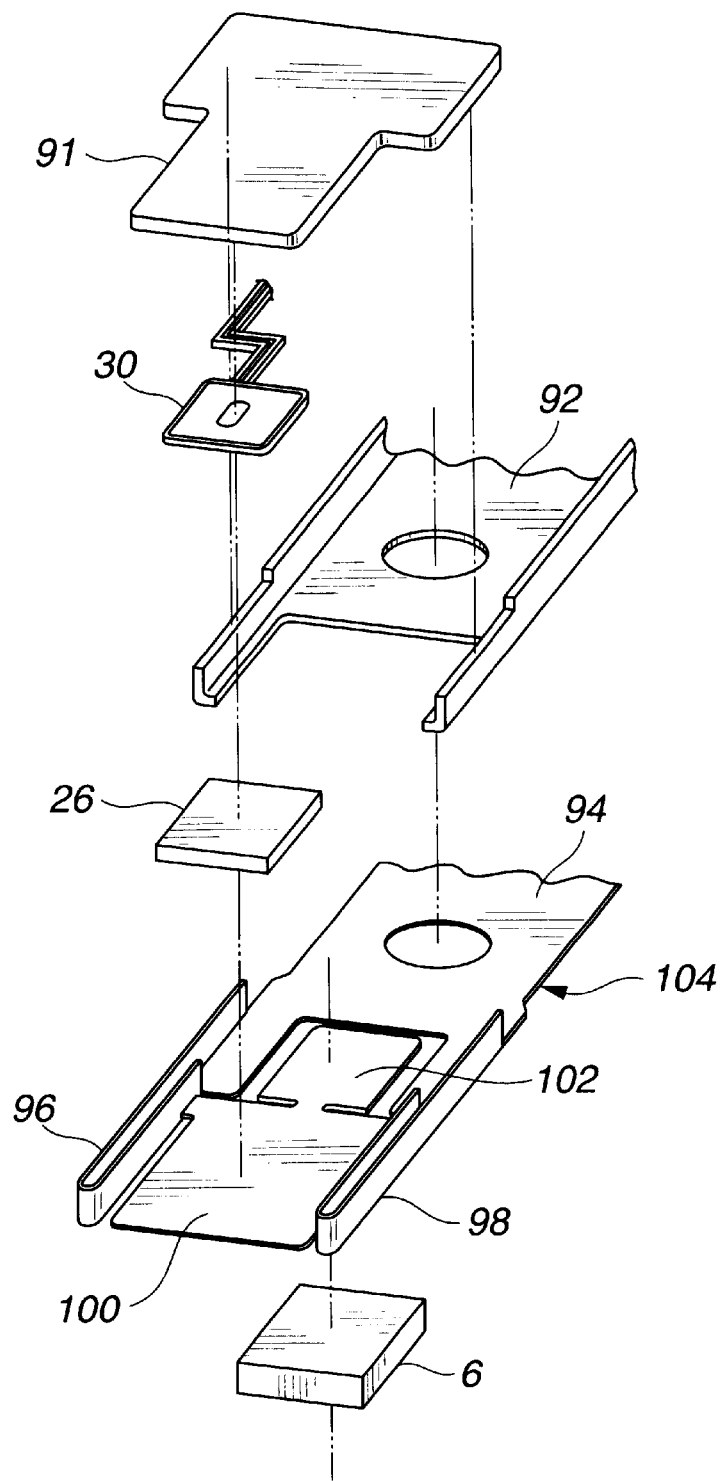
FIG. 18 is an exploded perspective view of a magnetic head actuator according to an eighth embodiment.

FIG. 18 shows an exploded perspective view of a magnetic head actuator according to an eighth embodiment of the present invention. In this embodiment, a rotor portion 100 is provided between micro-beams 96 and 98, and a gimbal portion 102 is provided on the rear side of the rotor portion 100, i.e., on the side of a load beam attachment portion 94. By the amount by which the rotor portion 100 where the permanent magnet 26 is provided is moved toward the front side, a fixing plate 91 for arrangement of the coil 30 is also projected toward the front side. In FIG. 18, numeral 92 denotes a load beam, and 104 denotes a micro-actuator.

Figure 19:
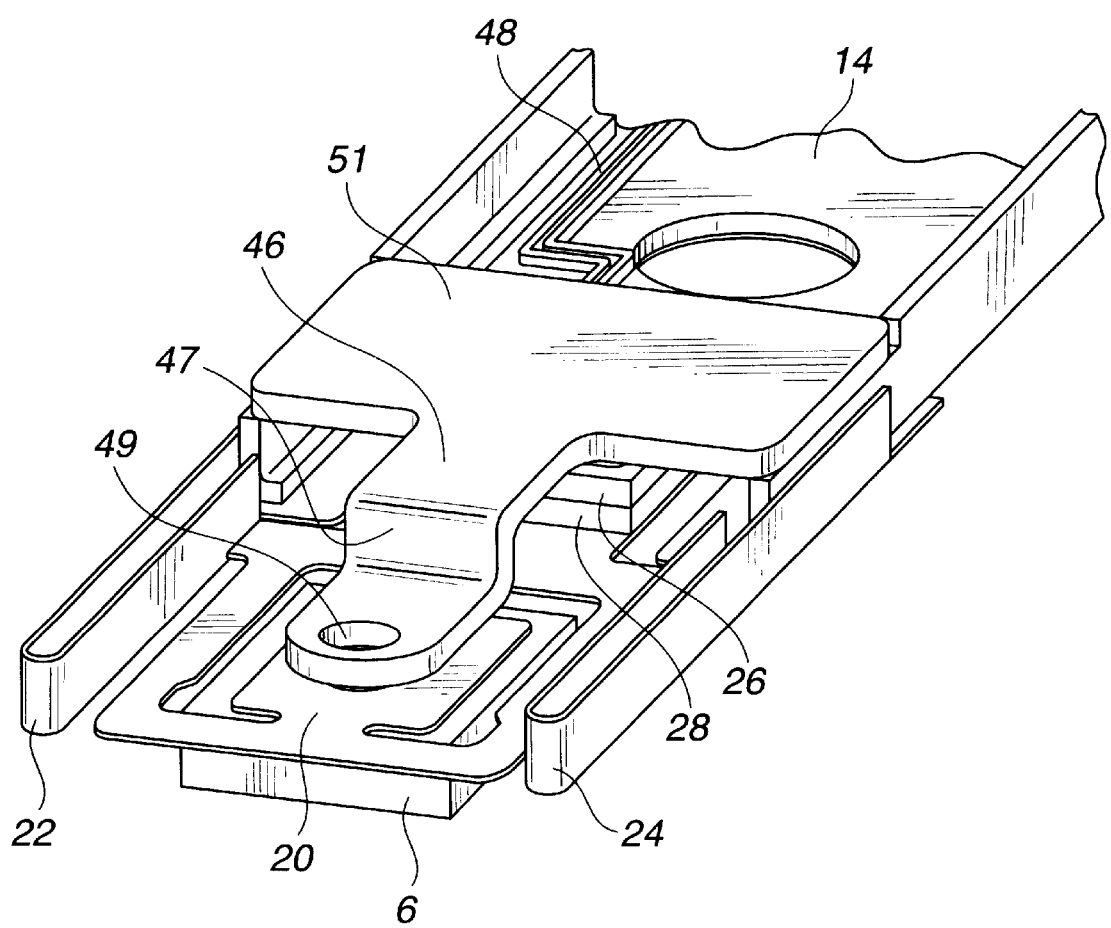
FIG. 19 is a perspective view of a magnetic head actuator according to a ninth embodiment.

FIG. 19 shows a perspective view of a magnetic head actuator according to a ninth embodiment of the present invention. In this embodiment, a beam 46 is attached to the front side of the fixing plate 51 in the seventh embodiment, and, further, a hollow 49 is provided at the tip end of the beam 46. The hollow 49 makes point contact with a gimbal portion 20 of a micro-actuator 36, and plays the role of exerting a pre-load on a head slider 6. If required, a bend portion 47 may be provided.

Figure 20:
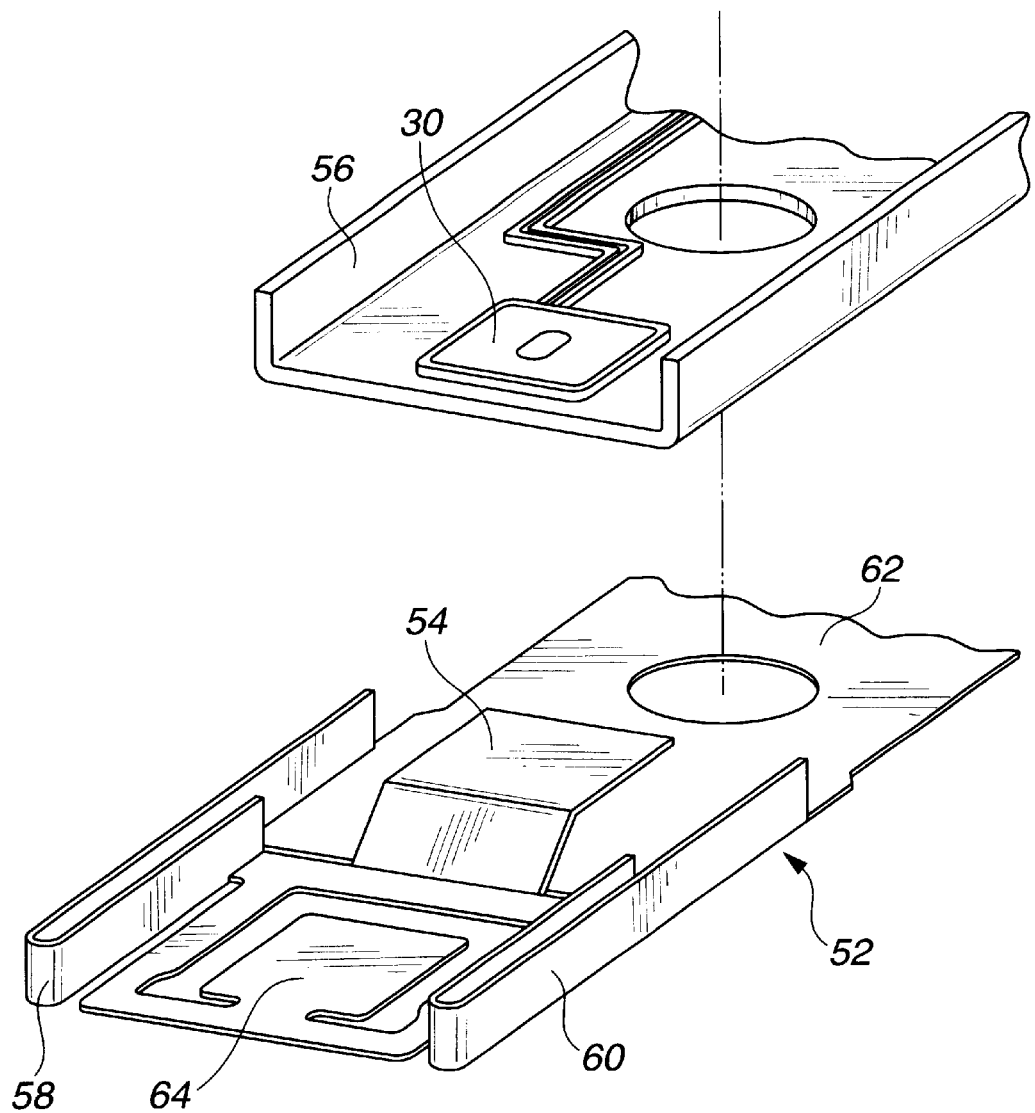
FIG. 20 is an exploded perspective view of a magnetic head actuator according to a tenth embodiment.
Figure 21:
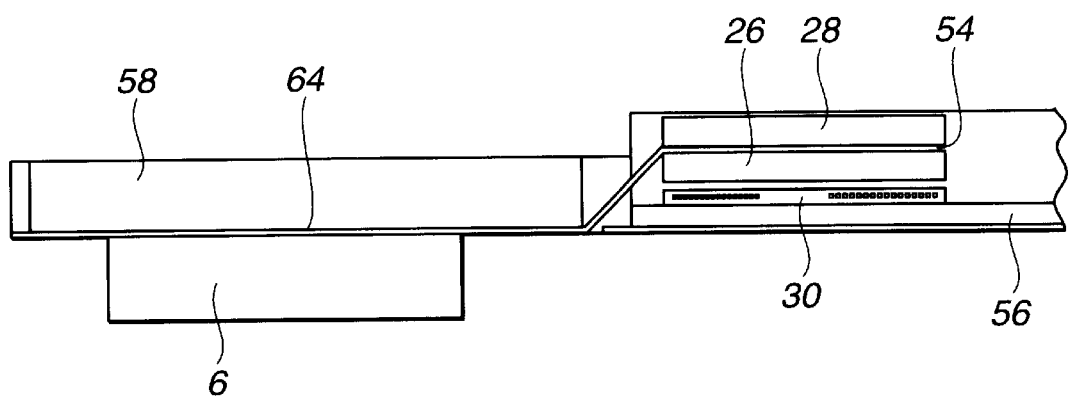
FIG. 21 is a sectional view of the magnetic head actuator according to the tenth embodiment.

Referring to FIG. 20, there is shown an exploded perspective view of a magnetic head actuator according to a tenth embodiment of the present invention. In this embodiment, a rotor portion 54 of a micro-actuator 52 is subjected to bending to be higher than a gimbal portion 64 by about 0.3 to 0.5 mm. The coil 30 is mounted on the load beam 56. Micro-beams 58 and 60 are so provided as to clamp the coil 30 and the tip end of the load beam 56 between the rotor portion 54 and a load beam attachment portion 62 thereof. FIG. 21 shows a partial sectional view of this embodiment. A permanent magnet 26 and a yoke 28, which have not been shown in FIG. 20 for simplification, are disposed at a surface of the rotor portion 54 on the coil side or the opposite side. Besides, they may be located with the rotor portion 54 therebetween, as shown in FIG. 21. Furthermore, by using a ferromagnetic material for the micro-actuator 52, the yoke 28 can be omitted.

Figure 22:
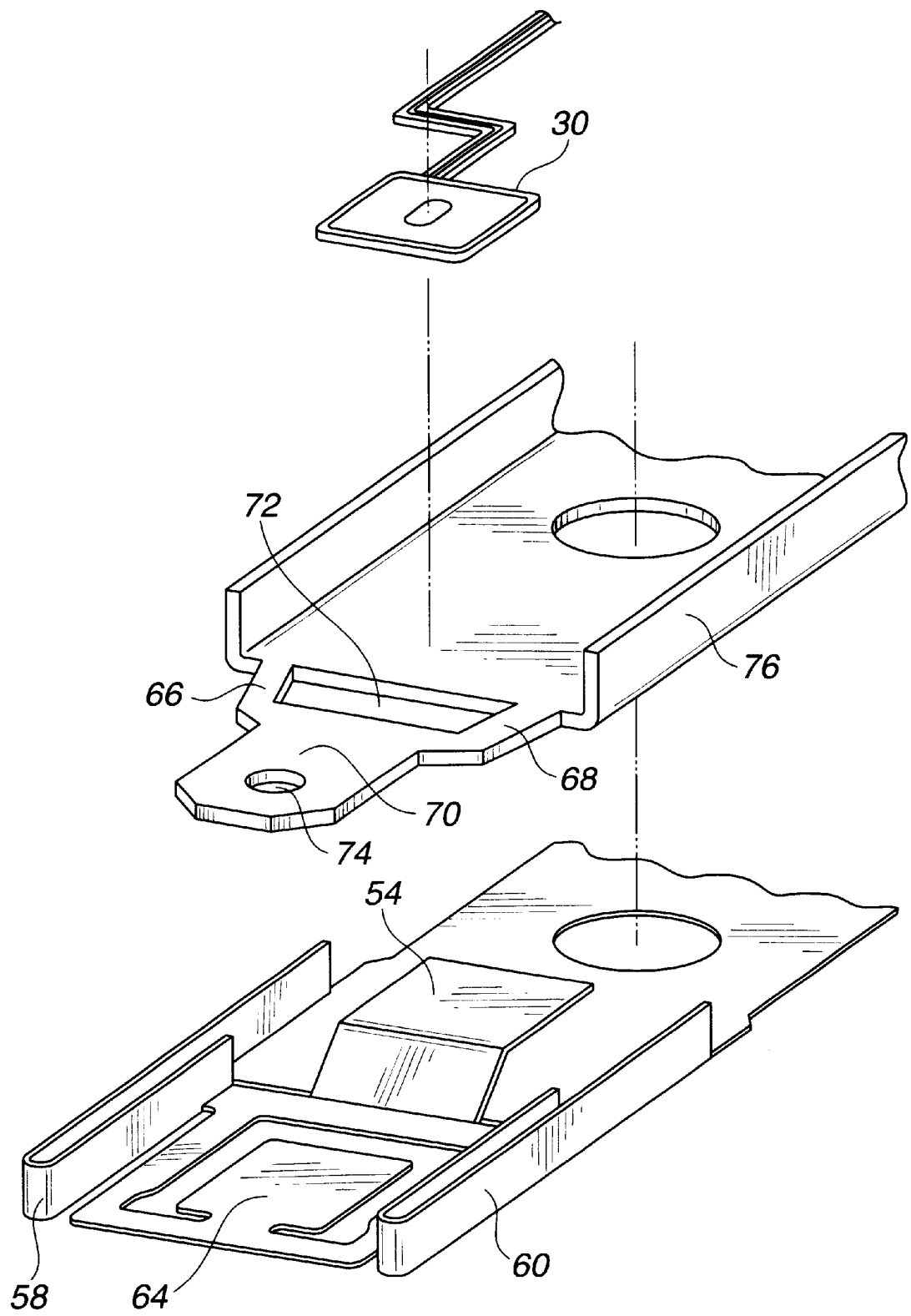
FIG. 22 is an exploded perspective view of a magnetic head actuator according to an eleventh embodiment.
Figure 23:
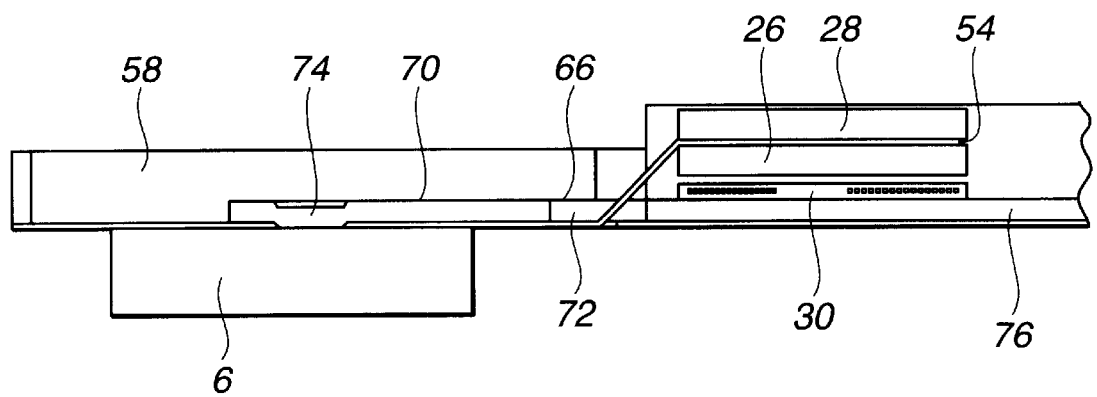
FIG. 23 is a sectional view of the magnetic head actuator according to the eleventh embodiment.

Referring to FIG. 22, there is shown an exploded perspective view of a magnetic head actuator according to an eleventh embodiment of the present invention. In this embodiment, a hole portion 72 formed by beams 66 and 68 extending from the left and the right and a flat portion 70 integrally projected in the manner of bridging the tip ends of the beams 66 and 68 is provided at the tip end of the load beam 76 in the tenth embodiment, and the flat portion 70 is provided with a hollow 74. A micro-actuator has its rotor portion 54 attached to the load beam 76 through the hole portion 72 of the load beam 76. FIG. 23 shows a partial sectional view of this embodiment. In the case of this embodiment, a pre-load can be exerted in the same manner as in the ninth embodiment, without increasing the number of component parts.

Figure 24:
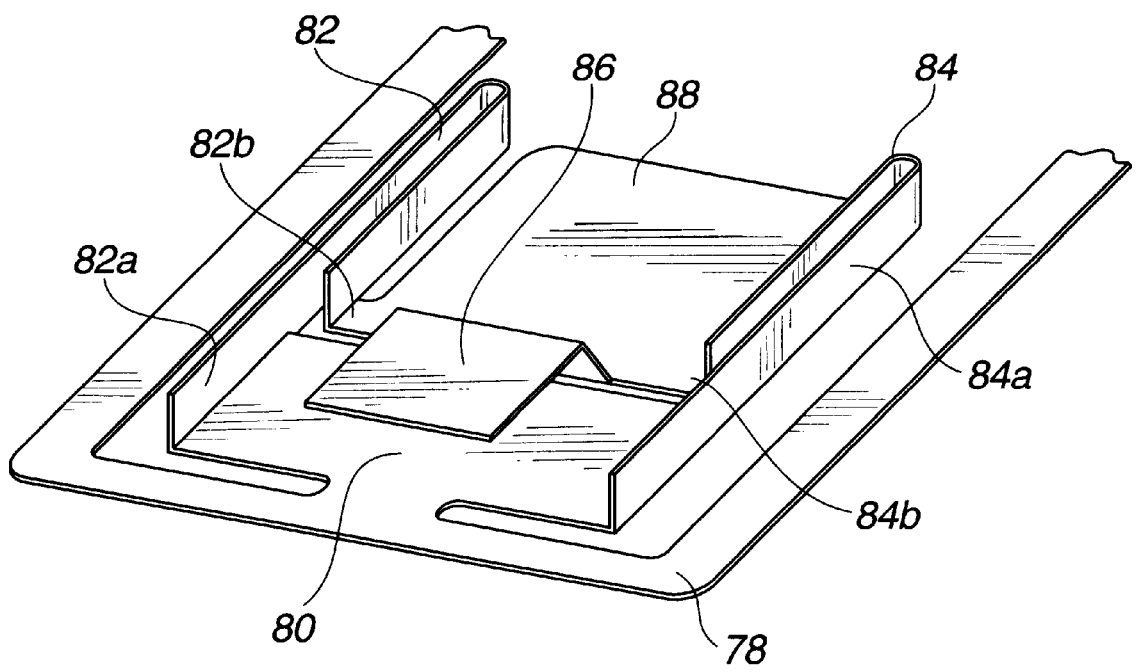
FIG. 24 is a partial enlarged perspective view of a micro-actuator according to a twelfth embodiment.
Figure 25:
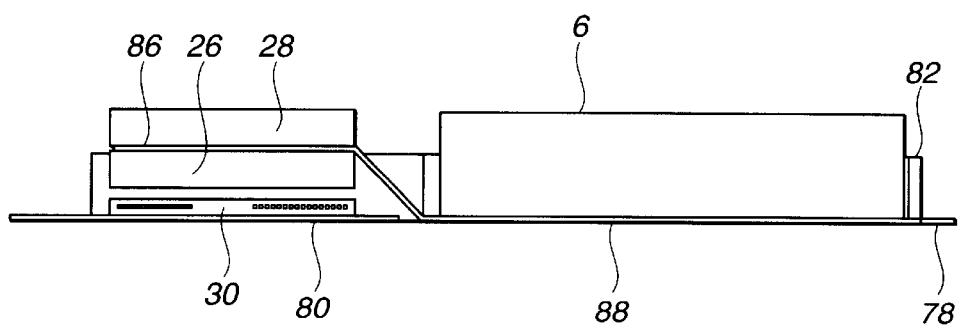
FIG. 25 is a partial enlarged sectional view of a magnetic head actuator according to the twelfth embodiment.

Referring to FIG. 24, there is shown an enlarged perspective view of a tip end portion of a micro-actuator according to twelfth embodiment of the present invention. In this embodiment, a stator portion 80, micro-beams 82 and 84, a rotor portion 86 and a slider attachment portion 88 are arranged in the inside of a gimbal portion 78. FIG. 25 shows a partial enlarged sectional view of a magnetic head actuator in this embodiment. A load beam and a wiring are not shown in the figure, for simplification. In the case of this embodiment, by containing the actuator in the gimbal portion, a further reduction in size can be realized.

In this embodiment, the rotor portion 86 and the slider attachment portion 88 are integrally connected to the micro-beams 82 and 84 through joint portions 82b and 84b thereof. In this case, long pieces 82a and 84a forming the micro-beams 82 and 84 are integrally connected to both side edges of a stator portion 80, and are bent at the both side edges; in addition, the long pieces 82a and 84a are extended toward the rear side (the load beam side), and are folded back at predetermined extension positions, and the rotor portion 86 and the slider attachment portion 88 are integrally connected to the long pieces 82a and 84a through joint portions 82b and 84b, as described above. In this case, also, the same effects as those in the seventh to eleventh embodiments are obtained.

As has been described above, according to the present invention it is possible to provide a magnetic head actuator which is high in reliability, simple in structure, and capable of achieving accurate positioning. Furthermore, by simplifying the structure of a micro-actuator, it is possible to enhance the productivity of the magnetic head actuator.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A magnetic head actuator for a magnetic recording disk drive, comprising a micro-actuator which is provided at a tip end portion of a load beam attached to an arm of a voice coil motor and which is for oscillating a magnetic head slider, wherein one end of said micro-actuator is fixed to a stator portion fixed to said load beam, a gimbal portion and a rotor portion oscillatably supported by metallic micro-beams formed are provided on the side of the other end of said micro-actuator, said metallic micro-beams each have a structure in which long pieces connected respectively integrally to both end edges of a tip end portion of a micro-actuator main body are bent substantially perpendicularly to the side of the load beam along both side edges, the long pieces are folded back by substantially 180° to the inside at the tip end position of the micro-actuator main body, and the gimbal portion and the rotor portion are connected integrally to the tip ends of the long pieces through joint portions, respectively, the magnetic head slider is attached to said gimbal portion, either one of a permanent magnet and a coil is disposed at the stator portion, the other of said permanent magnet and said coil is disposed at said rotor portion, and said rotor portion and said magnetic head slider attached to said gimbal portion as one body with said rotor portion are oscillated by passing an electric current through said coil.

2. A magnetic head actuator as set forth in claim 1, wherein a pair of said micro-beams are disposed on both sides of said rotor portion and said gimbal portion, support said magnetic head slider through said gimbal portion, are sufficiently displaced in a tracking direction of a disk by a driving force generated by said stator portion and said rotor portion, and have high rigidity in the other directions.

3. A magnetic head actuator for a magnetic recording disk drive, comprising a micro-actuator which is provided at a tip end portion of a load beam attached to an arm portion of a voice coil motor and which is for oscillating a magnetic head slider, wherein a stator portion is provided at one end of said micro-actuator in a gimbal portion, a slider attachment portion and a rotor portion oscillatably supported by metallic micro-beams formed are provided on the side of the other end of said micro-actuator, said metallic micro-beams each have a structure in which long pieces connected respectively integrally to both end edges of a tip end portion of a micro-actuator main body are bent substantially perpendicularly to the side of the load beam along both side edges, the long pieces are folded back by substantially 180° to the inside at the tip end position of the micro-actuator main body, and the gimbal portion and the rotor portion are connected integrally to the tip ends of the long pieces through joint portions, respectively, said magnetic head slider is attached to said slider attachment portion, either one of a permanent magnet and a coil is disposed at said stator portion, the other of said permanent magnet and aid coil is disposed at said rotor portion, and the rotor portion and the magnetic head slider attached to said slider attachment portion as one body with said rotor portion are oscillated by passing an electric current through said coil.

4. A magnetic head actuator as set forth in claim 3, wherein a pair of said micro-beams are disposed on both sides of said rotor portion and said slider attachment portion, support said magnetic head slider through said slider attachment portion, are sufficiently displaced in a tracking direction of a disk by a driving force generated by said stator portion an said rotor portion, and have high rigidity in the other directions.

5. A magnetic head actuator as set forth in claim 1 or 3, wherein said micro-beams are integral with a fixing portion for fixing to said load beam, said rotor portion and said gimbal portion, and comprises at least one folded-back portion.

6. A magnetic head actuator as set forth in claim 1 or 3, wherein a ferromagnetic alloy is used for said load beam.

7. A magnetic head actuator as set forth in claim 1 or 3, wherein a ferromagnetic alloy is used for said rotor portion.

* * * * *